United States Patent [19]

Green et al.

[11] 4,153,931

[45] May 8, 1979

[54] AUTOMATIC LIBRARY CONTROL APPARATUS

[75] Inventors: Wendel C. Green, Annandale, Va.; Russell E. Cunningham, Washington, D.C.; Gordon S. Light, Chevy Chase, Md.; Patrick J. Sharkitt; Charles W. Webster, both of Silver Spring, Md.

[73] Assignee: Sigma Systems Inc., Arlington, Va.

[21] Appl. No.: 521,468

[22] Filed: Nov. 6, 1974

Related U.S. Application Data

[63] Continuation of Ser. No. 366,928, Jun. 4, 1973, abandoned, which is a continuation of Ser. No. 144,197, May 17, 1971, abandoned.

[51] Int. Cl.$^2$ .......................... G06F 3/04; G06F 7/22; G06F 15/06; G06F 15/40
[52] U.S. Cl. .................................. 364/200; 364/419
[58] Field of Search ................... 340/172.5; 444/1; 235/61.11 A, 61.12 N, 61.7 B; 364/200 MS File, 900 MS File, 300, 400, 401, 403, 406, 407, 408, 419

[56] References Cited

U.S. PATENT DOCUMENTS

| | | | |
|---|---|---|---|
| 2,288,770 | 7/1942 | Armbruster | 235/61.11 A |
| 2,910,238 | 10/1959 | Miles et al. | 340/172.5 |
| 3,039,582 | 6/1962 | Simjian | 235/61.7 B |
| 3,089,125 | 5/1963 | Reynolds, Jr. | 340/172.5 |
| 3,210,733 | 10/1965 | Terzian et al. | 340/172.5 |
| 3,335,407 | 8/1967 | Lange et al. | 340/172.5 |
| 3,341,820 | 9/1967 | Grillmeier, Jr. et al. | 340/172.5 |
| 3,407,387 | 10/1968 | Looschen et al. | 340/172.5 |
| 3,454,936 | 7/1969 | Bridge et al. | 340/172.5 |
| 3,573,739 | 4/1971 | Zeitlin | 340/172.5 |
| 3,597,742 | 8/1971 | Phillipps et al. | 340/172.5 |
| 3,643,068 | 2/1972 | Mohan et al. | 235/61.12 N |
| 3,686,637 | 8/1972 | Zachar | 340/172.5 |

OTHER PUBLICATIONS

*Computer Potential in Maryland*, by E. B. Hage, in "Wilson Library Bulletin", Dec. 1966, pp. 401–403.
*Booth Library On-Line Circulation*, by P. V. Rao et al., in "Journal of Library Automation", vol. 4, No. 2, Jun. 1971, pp. 86–102.

*Primary Examiner*—Melvin B. Chapnick
*Attorney, Agent, or Firm*—Bacon & Thomas

[57] ABSTRACT

An on-line computerized system useful in automatic document control and inventory systems such as that needed in libraries with a large number of books, records, films, and other items. In the library system disclosed, each borrower and each item within the library is given a unique identification number. The system includes automated Check-In/Check-Out terminals at each branch library which are interfaced to a computer for facilitating patron services and permitting fast, on-line storage and retrieval of data concerning overdue fines, reserve books, expired and delinquent patron cards, and other pertinent information.

11 Claims, 34 Drawing Figures

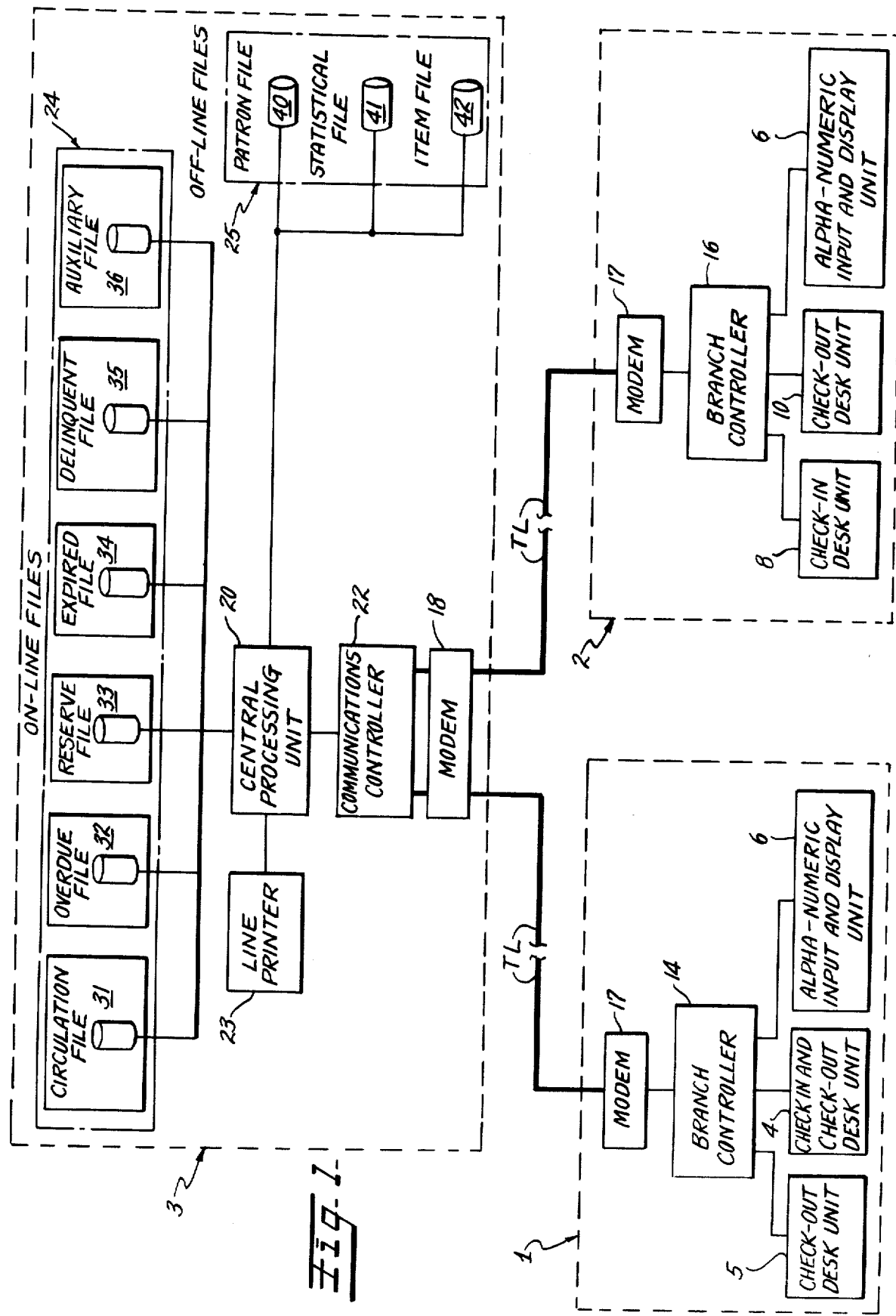

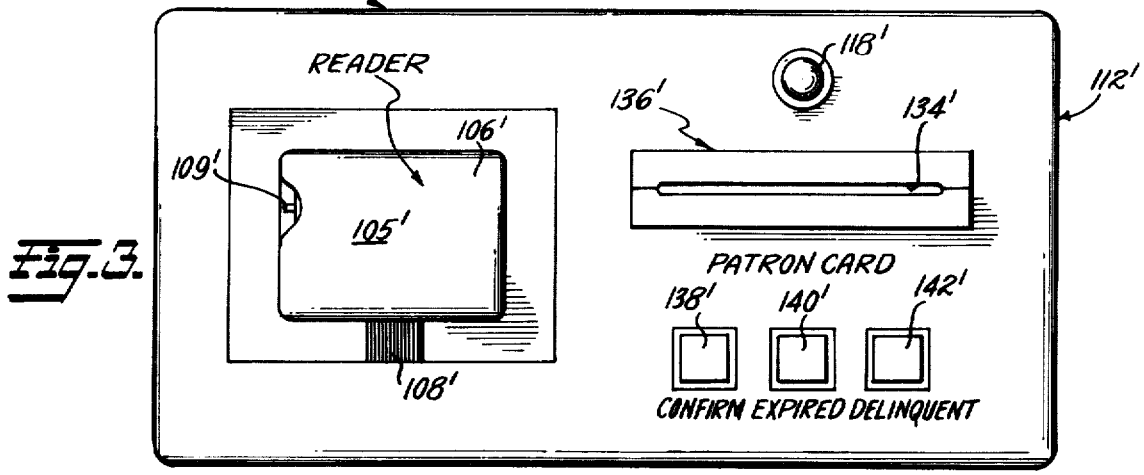
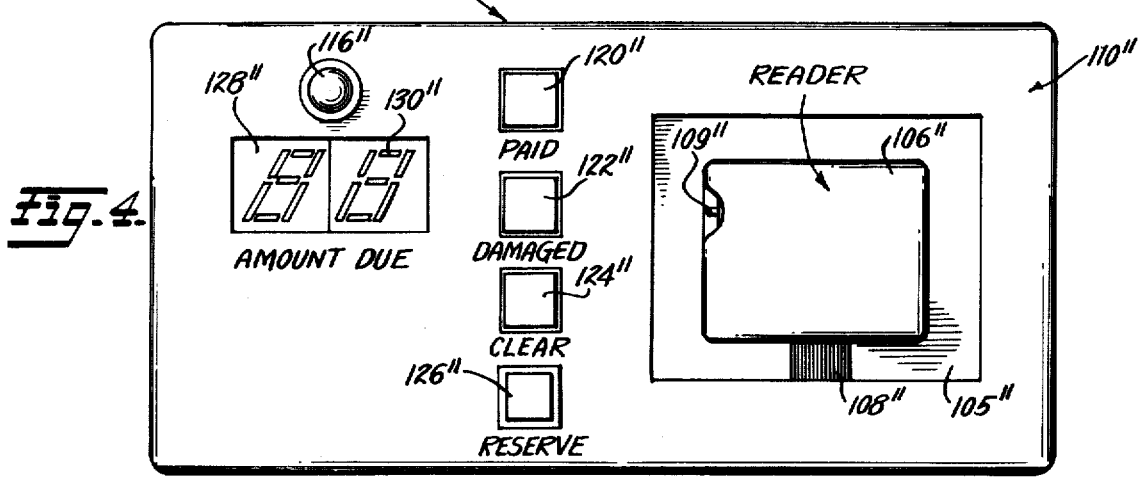
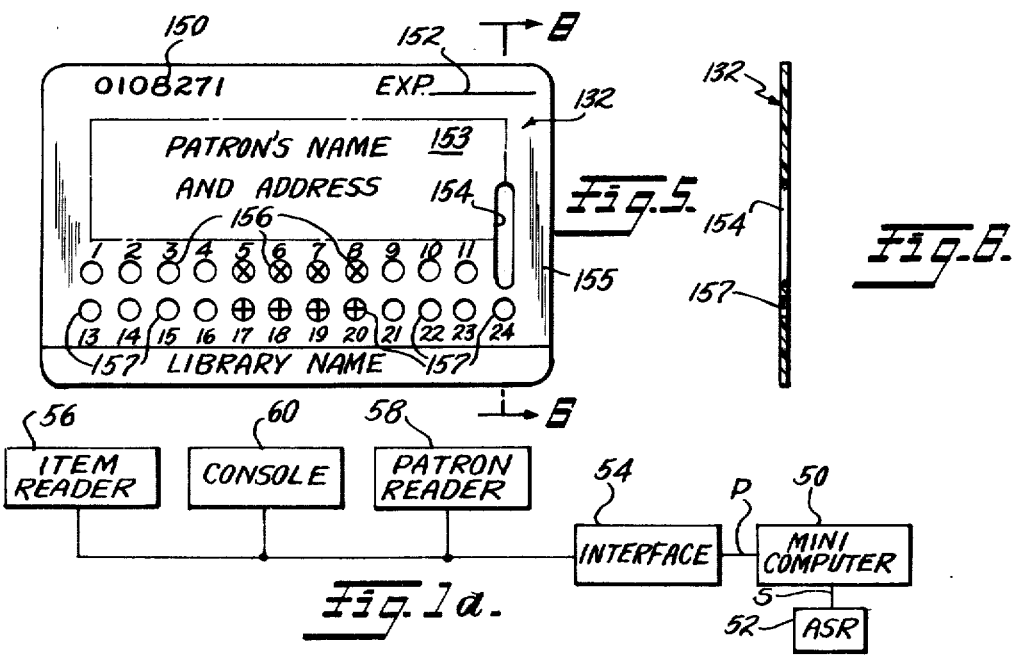

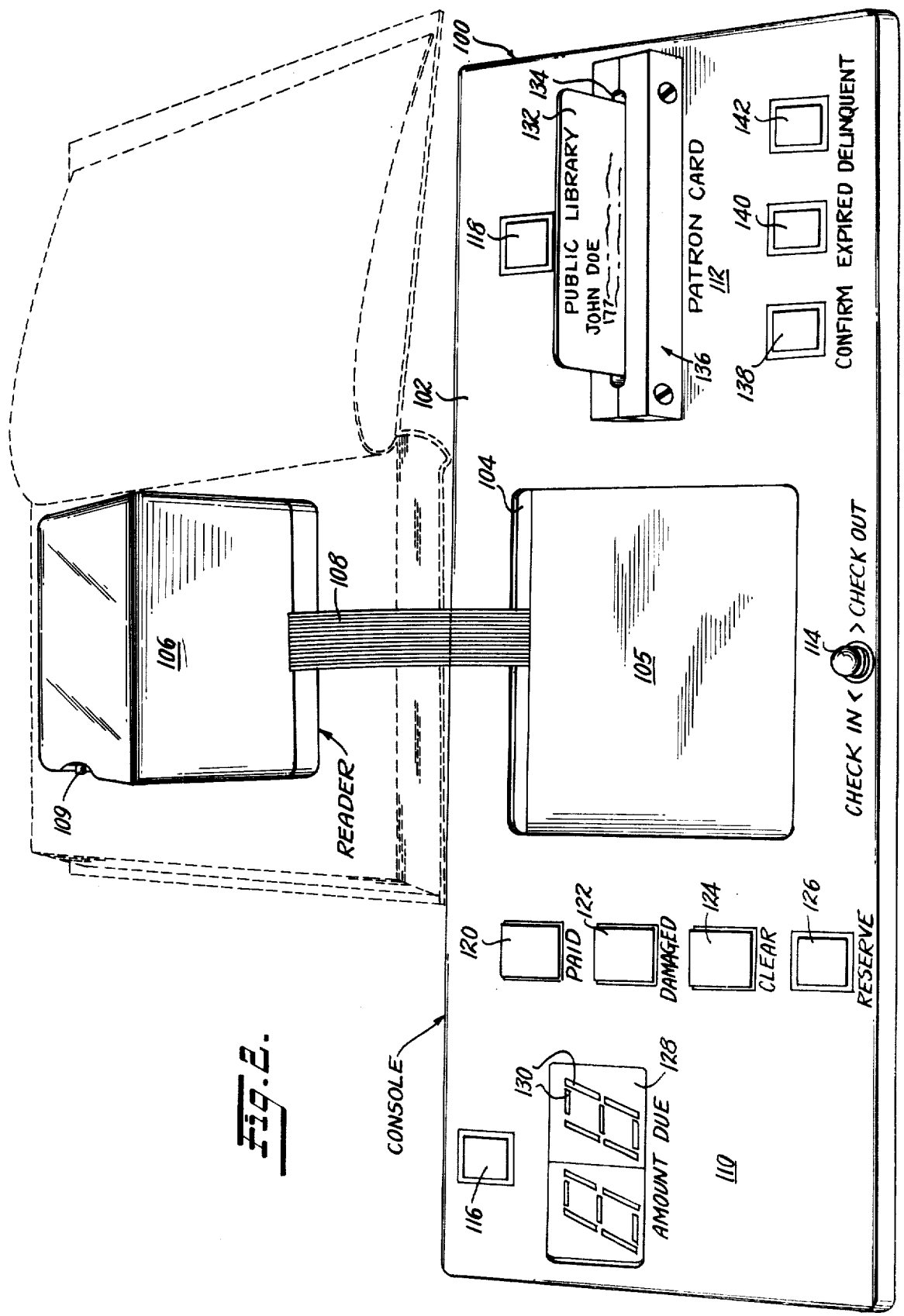

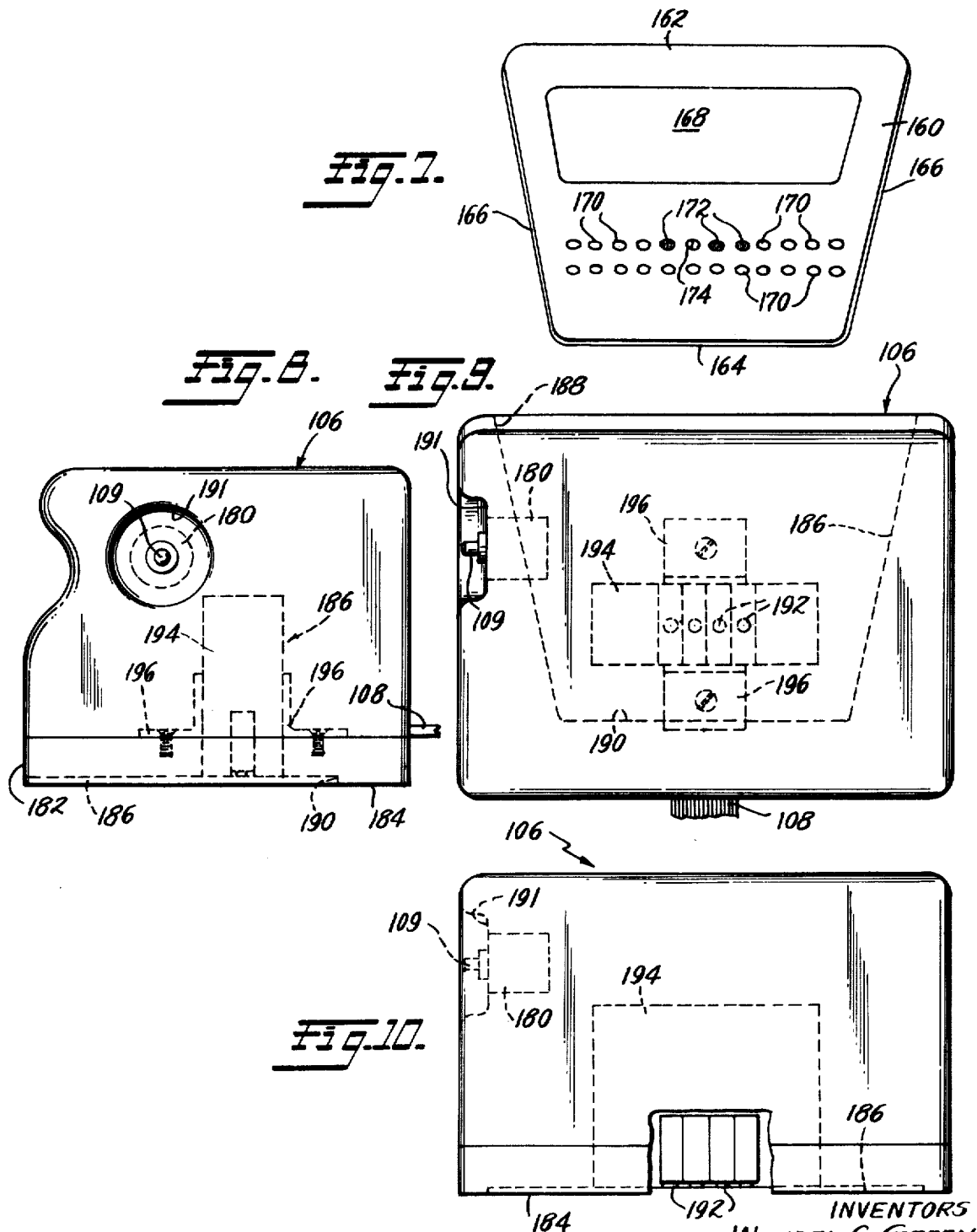

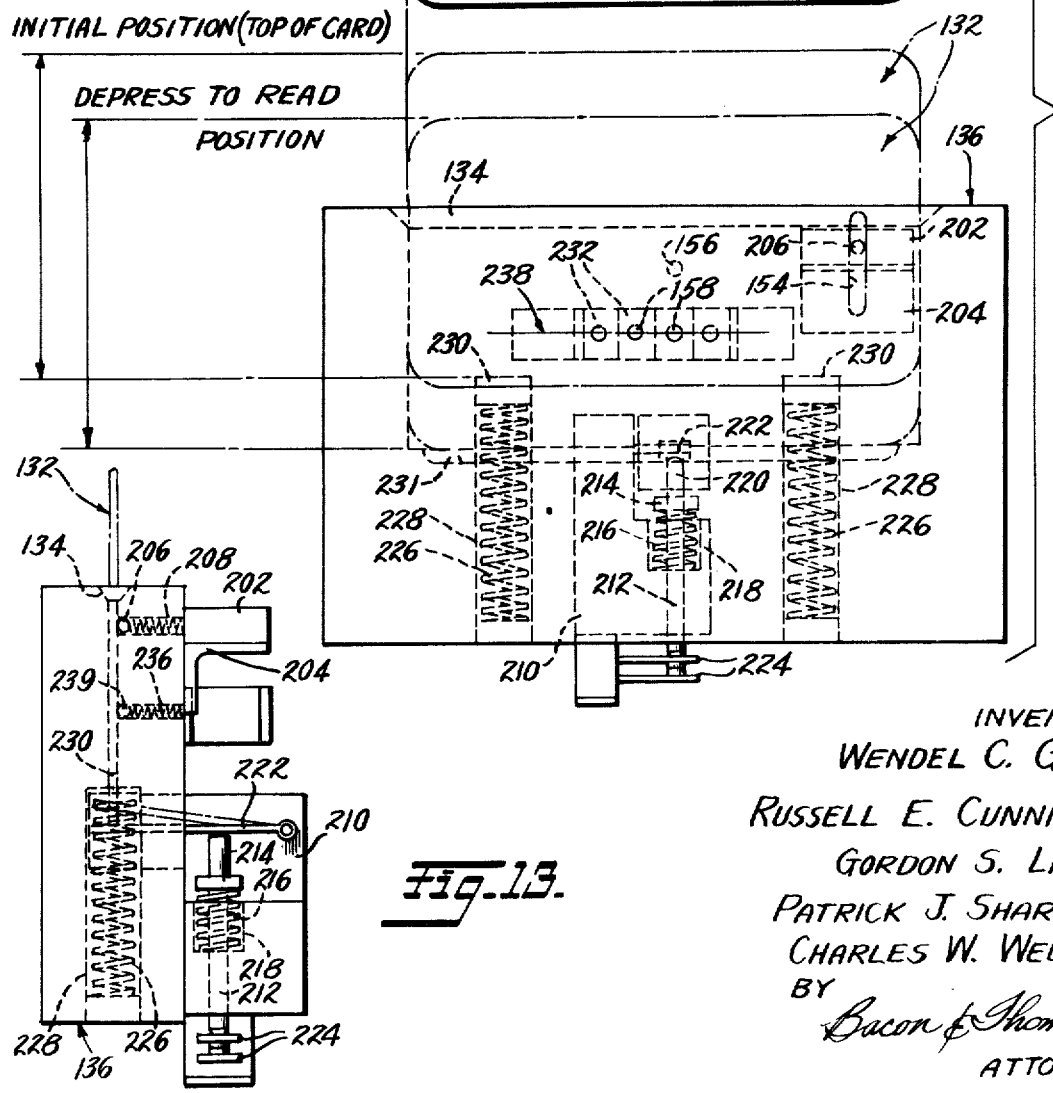

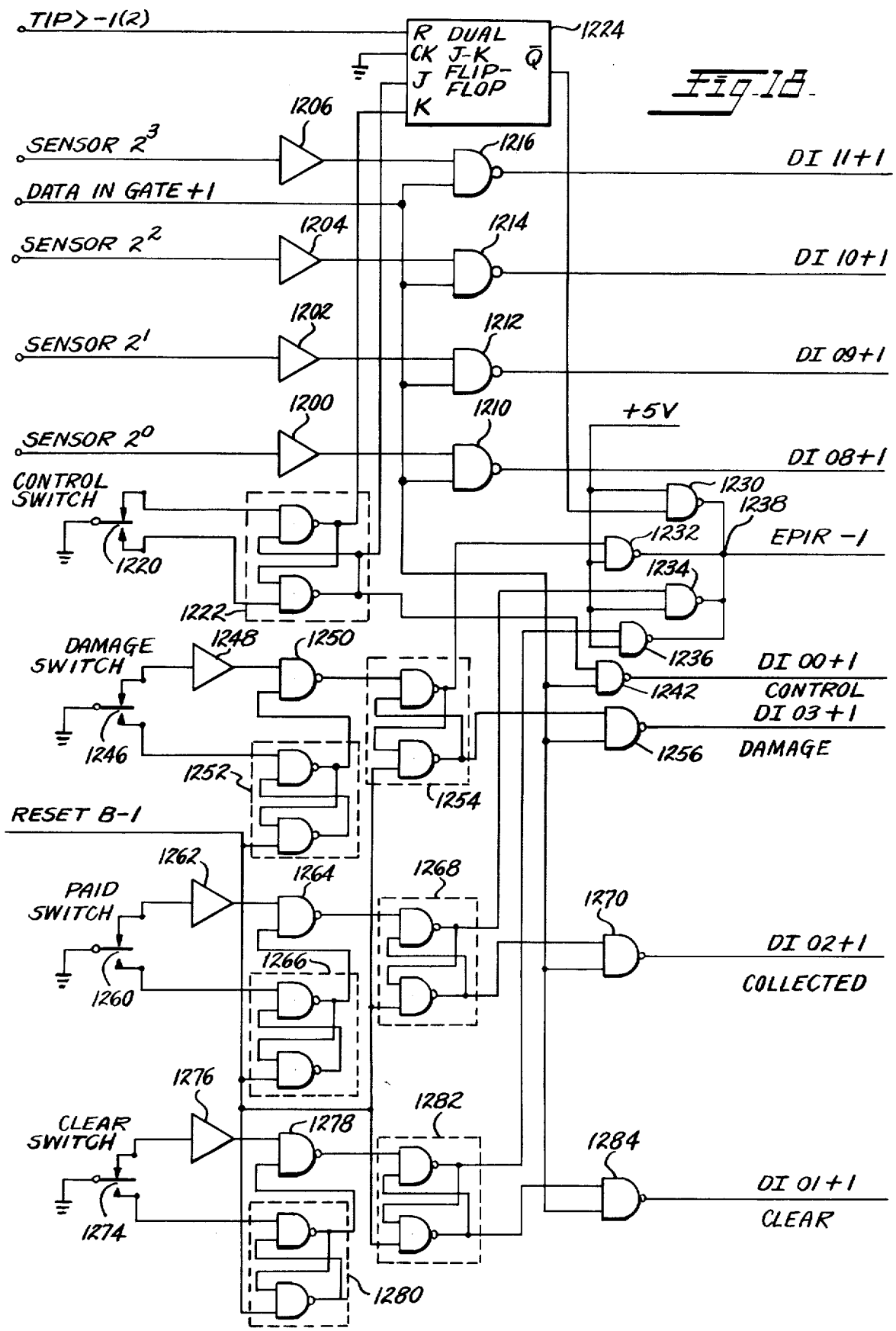

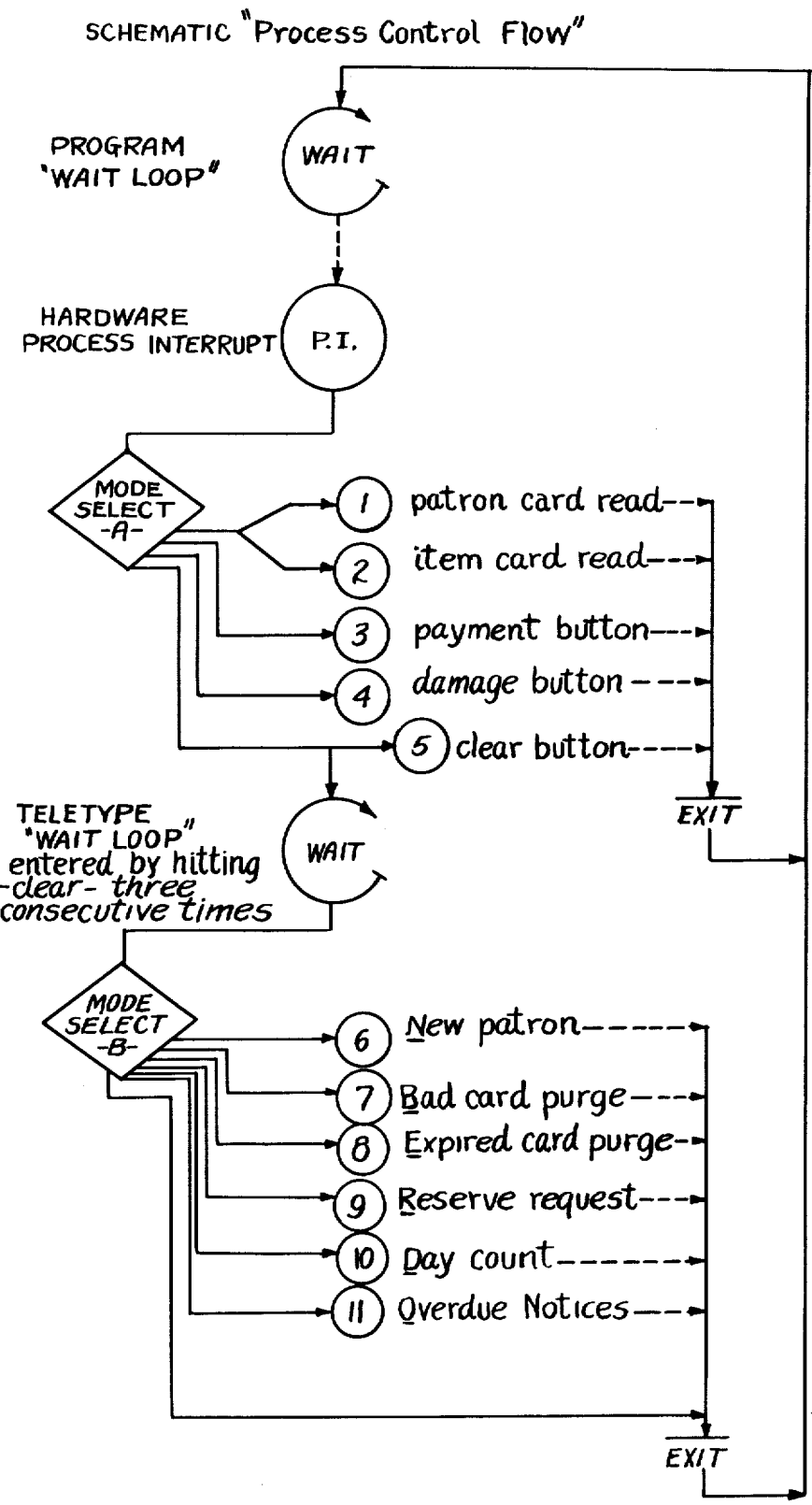

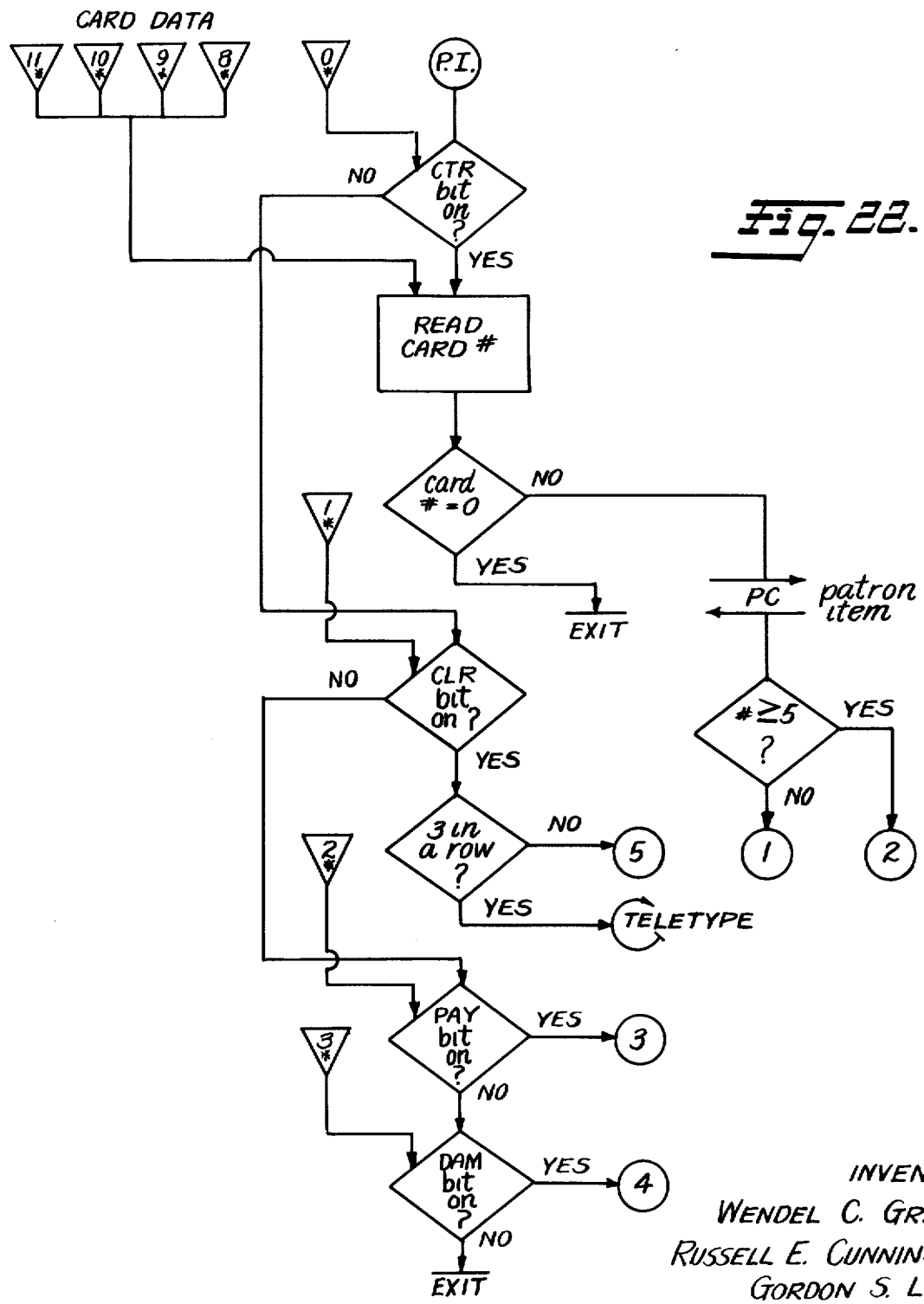

INVENTORS
WENDEL C. GREEN
RUSSELL E. CUNNINGHAM
GORDON S. LIGHT
PATRICK J. SHARKITT
BY CHARLES W. WEBSTER
Bacon & Thomas
ATTORNEYS INVENTORS
WENDEL C. GREEN
RUSSELL E. CUNNINGHAM
GORDON S. LIGHT
PATRICK J. SHARKITT
CHARLES W. WEBSTER
BY
Bacon & Thomas
ATTORNEYS

AUTOMATIC LIBRARY CONTROL APPARATUS

This is a continuation, of application Ser. No. 366,928, filed June 4, 1973, which is a continuation of Ser. No. 144,197, filed May 17, 1971, now both abandoned.

BACKGROUND

1. Field of Invention

The invention pertains to a computerized library circulation system for facilitating check-in/check-out procedures and maintaining current information files on the status of library items and patrons.

2. Prior Art

In the area of public lending libraries, it has been found that the demand placed on them and their circulation has increased considerably faster than the population. For example, in certain suburban areas the circulation of the library has been approximately six books per year for every man, woman and child in the county. The increased demand for facilities, acquisition of books, and public services—all within budgetary limitations—has caused the public libraries to look more and more toward automation. This is because the professional library staff has found itself extensively involved in clerical tasks which is a detriment to the functions of cataloging, research and acquisition.

Partially automated library systems are presently available. However, these systems which employ computer or microfilming techniques are highly inefficient, primarily due to the large number of manual steps required in their operation. For example, if a computer is used, a print-out is periodically provided to the library which contains a record of delinquent patrons, i.e., patrons whose overdue fines exceed some predetermined limit, for example, $5.00. In a large library system, such a list may contain in excess of 10,000 listings. It is presently necessary for the librarian to manually look up the number of each patron checking out a book to see if his card number is on the delinquent card list. The time required and the tediousness of the process usually makes it difficult, if not impossible, for the librarian to make such a manual check. In most county libraries, an estimated 10% of the total registered patrons are delinquent. This may entail fees of almost %50,000 owed to the library. Such fees are largely uncollected simply because of the time required to check the listing for each transaction.

Present day library systems such as "Regiscope" or "Recordex" employ filming processes, together with T-card (transaction card) identifying means. In these systems, a 51 column Hollerith pre-punched card is placed in the pocket of each book. Each library user, or patron, carries his own identification card. When a patron desires to check out a book, his card together with the Hollerith T-card is photographed with a "Regiscope" camera. The microfilm record is then stored and provides the only complete record of the transaction. Later, if a book does not come in on time, this film must be searched frame by frame to find the patron's name and address, The librarian must then check the recently returned books and the book shelves to see if the book has been returned. If the book is not found, an overdue notice is typed and sent to the patron.

The reserve book procedure of present day library systems is also cumbersome. A patron desiring to reserve a book fills out a reserve request card which is placed in a visual file reader which is maintained at the circulation desk. Thus, every time a book is returned, the title must be manually checked against the visual file listing.

Additional disadvantages of the present day off-line and partially automated computerized library systems are readily apparent. Overdue fines must be computed manually when a book is returned and the collections must then be recorded by the desk clerk. Each patron card must be examined for expiration, a step which is often omitted, especially during busy library hours. Further, statistical information concerning patron and book usage is limited to raw transaction counts by each branch library.

SUMMARY OF THE INVENTION

The instant invention replaces many of the manual steps required by present off-line library systems by a computerized on-line system.

The on-line circulation control system comprises a central processing site which houses the computer facilities and the on-line disc or tape storage units. The central site is connected to a plurality of branch controllers, each located at a local branch library. Each branch library contains Check-In and Check-Out consoles together wiith auxiliary input/output (I/O) means used to display messages from the central computer and to enter new data from each branch into the central on-line files.

Each book and each patron are given an unique identifying number. When a user desires to check out a book, his card number together with the book label number are read into the branch controller. The controller codes the information and transmits it to the central processing unit which checks the current status of the patron. If the patron has been delinquent, such information is immediately transferred to the branch library and displayed on the auxiliary I/O units. Thus, the manual checking of a delinquent print-out is eliminated by using an on-line delinquent file search. Even in large library systems, having 10,000 delinquent patrons, the waiting time for the patron is a matter of a few seconds. The central processing unit will further record the complete transaction on-line so that a circulation inventory is always updated and available.

Upon checking in a book, the patron card need not be presented. The book identifying number is read by the console and the overdue item files are checked on-line against the incoming book number. Overdue fines are automatically displayed and recorded, thus eliminating manual computations and recordings which are susceptible to error. When an item is returned, a reserve file is automatically searched by the central computer to determine if the returned item has been reserved by a patron. If the item is on the reserve list a message is transmitted to the branch terminal informing the clerk of the name of the borrower who has requested the item. Simultaneously, a line printer connected to the central site computer is used to print out a notice to be mailed to the borrower, informing him that his book is available.

The above approach reduces the current clerical effort by as much as 75%. Periodically, for example, daily or weekly, the central computer searches the files for overdue books and prints overdue notices to be mailed to the borrowers. This requires less than 25% of the clerical effort normally required. The collection and printing of statistical data (i.e., circulation rate for any given title) for use by the library administration would be by-product of the procedure described above.

The library card given to each patron, as well as the book card located in a given position in the book, are read by suitable readers locaated in the branch libraries. These readers may be optical, magnetic or mechanical means as explained below. By collecting the book and patron numbers in this manner, one eliminates the use of punched cards and photographic film.

An object of the instant invention is to provide an electronic or computer controlled inventory control system for public libraries, namely, a circulation control system based on a network connecting various branches of a public library system to a single small computer.

Another object of the invention is to provide one-line data storage and retrieval to facilitate check-in and check-out procedures.

Another object of the invention is to provide one-line data storage and retrieval to facilitate the collection of overdue book fines, and fines attributed to delinquent patrons.

Another object of the invention is to provide on-line data storage and retrieval to facilitate the location of reserve items and the notification of patrons on the reserve item list.

Another object of the invention is to provide an on-line communication system to automatically indicate that a patron card presented at the check-out desk is expired.

Another object of the present invention is to provide an automated means for the production of reserve-hold notices for books which a patron wishes to reserve.

A further object of the present invention is to provide detailed statistical information concerning patron use and book circulation data.

Still another object is to provide a improved Check-In/Check-out consoles for use in a library environment.

An object is to provide a card and reader therefor which facilitates easy alignment.

BRIEF DESCRIPTION OF THE DRAWINGS

Other objects and advantages of the invention will become more apparent from the following detailed description taken in connection with the accompanying drawings, wherein:

FIG. 1 is a block diagram of the multi-branch library system;

FIG. 1a is a modified version of FIG. 1 for a single unit library;

FIG. 2 is a perspective view of the combination console with the reader in place relative to a book to be checked out;

FIG. 3 is a top plan view of a check-out console;

FIG. 4 is a top plan view of a check-in console;

FIG. 5 is a plan view of a patron's card;

FIG. 6 is a cross section taken through lines 6—6 in FIG. 5;

FIG. 7 is a plan view of an item card or decal;

FIG. 8 is a side elevation view of the item reader;

FIG. 9 is a top view of the reader illustrated in FIG. 8 with the sensors and item decal slot;

FIG. 10 is a side view, partially broken away illustrating the back view of the reader of FIGS. 8 and 9;

FIG. 12 is a top view of the patron card reader of FIG. 11;

FIG. 13 is a side elevation view of the patron card reader taken from the right side of FIG. 11;

FIGS. 21-32 are the program flow charts.

MULTI-BRANCH LIBRARY SYSTEM

Figure 20:
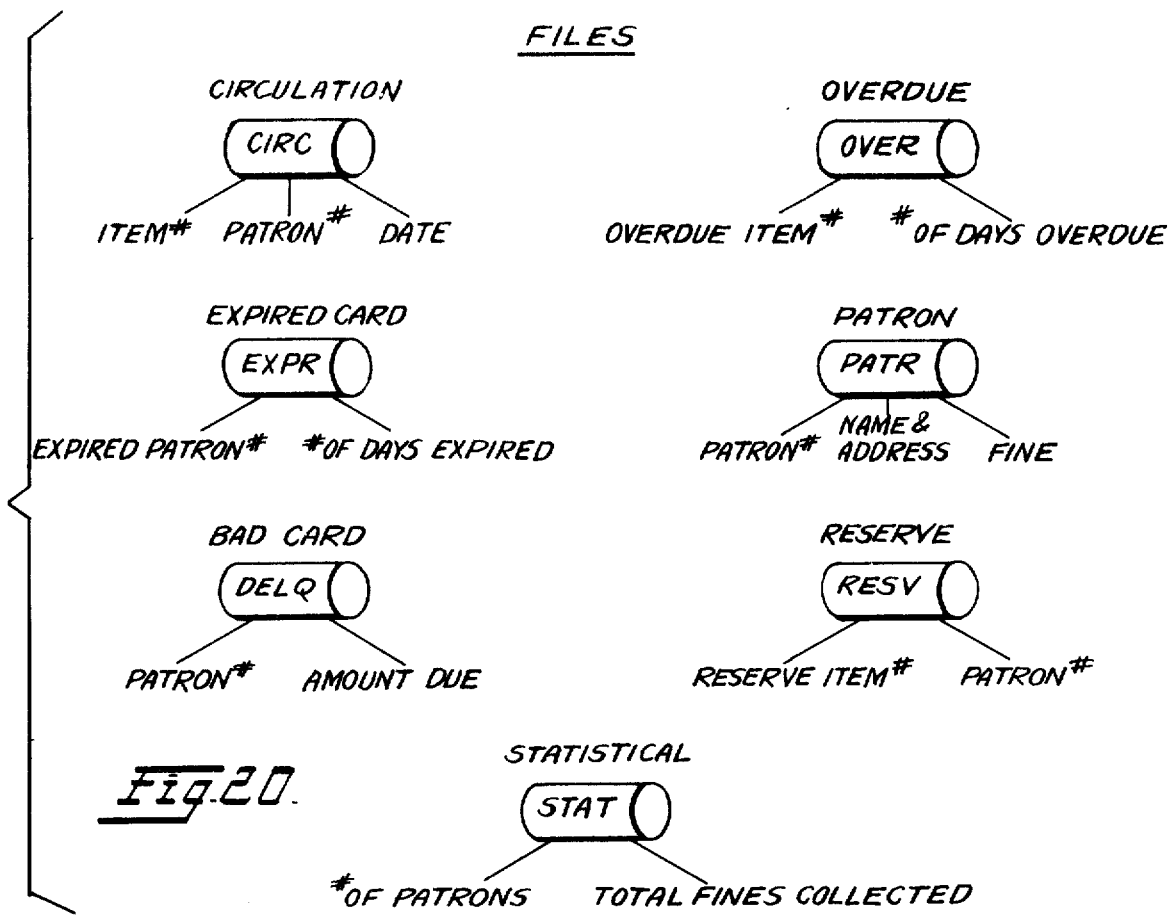
FIG. 20 illustrates the data stored in the data memory files used in the computer program.

FIG. 1 shows an overall view of the present invention as applicable in a large library system. A pair of branch libraries 1 and 2 are shown connected over a plurality of telephone lines TL to a central site 3 housing the central control units. The diagram shows two branch libraries, but it is readily understood that the system may be expanded to include additional local branches as desired. Local library branch 1 comprises a Check-In/Check-Out console 4, a Check-Out console 5, and an alpha-numeric input and output display unit 6. The Check-In/Check-Out consoles are discussed below in greater detail. The I/O unit 6 may comprise a CRT display together with a keyboard such as the commercially available Infton VISTA 1 unit. Other types of I/O units may be employed such as teletype printers, non-impact printers, or an IBM "Selectric" with microdyne appliqué. The Check-In and Check-Out consoles may be separated for convenience of use as shown by units 8 and 10 respectively in the local branch 2. A branch controller 14 or 16 is used to code the input and output data and interfaces the I/O units to the computer. The interface description is given in detail below. A modem 17 such as the Intertel Model 235, is provided to convert the digital data from the branch controller to an analog signal which is transmitted over the telephone lines TL. A second modem 18 is used at the central receiving site.

The central site 3 includes a central processing unit 20, a communications controller 22, and modem 18, a line printer 23, and a series of on-line data files 24 and off-line files 25. The central processor may be any of a large variety of computers such as the 8K word storage (16bits) Data General NOVA 1200.

I/O devices (not shown) for loading the program into the computer are available in a large variety of models and are well known in the art. The communications controller 22 is available commercially and the Data General Option #4026 is a compatible unit. The controller used with the NOVA 1200 is a 16 line multiplexer for serial-to-parallel data conversion. The on-line file storage disc and off-line tape units may be selected from the IDS 7700 series controller and the Per Data tape transport, respectively. The line printer 23 may be, for example, the Nortec Model 200 printer.

The on-line files consist of the following files: a circulation file 31 which contains the patron identification number and the item number together with the date of the transaction, an overdue file 32 which contains the overdue item number and the number of overdue days, a reverse file 33 containing the reverse item number and the corresponding patron number, and expired file 34 which stores the expired patron's number together with the number of days the card has expired, a delinquent file 35 which contains the delinquent patron number and the amount owed by the delinquent account, and an auxiliary file 36 which is used for temporary data storage. The off-line files 25 comprise: a patron file 40 which contains the patron number and the name and address of the patron together with any fine accumulated from the overdue files of from returning damaged books, a statistical file 41 which stores the number of patrons and the total fines collected and may also be used for specialized statistical information needs, and an item file 42 which contains a complete inventory of items in the library system.

The operation of the computer system shown in FIG. 1 is initiated by a patron desiring a check-in or check-out a book. For the check-out mode, the patron must present the books desired as well as his patron identification card. The book label and the patron card are read simultaneously in the Check-Out console 5 or the combination Check-In/Check-Out console 4. The local branch controller 14 then codes the data read from the patron card and the item label and transmits this data via the telephone lines to a communications controller 22.

The computer is programmed to search the expired file 34 and the delinquent file 35. If the patron card number does not match with any of the numbers stored on files 34 or 35, a confirming signal is transmitted to the branch controller indicating that the patron may check out the book.

Once a confirming signal is registered at the branch library, the central processing unit will automatically store the check-out transaction in the circulation file 31. If the patron has several books, each book label is read and stored as a separate transaction in the circulation file. The check-out procedure is then complete. If, however, the patron identification number matched with, for example, a delinquent number, a message is printed on the delay unit 6 indicating the patron's identification number and the amount of the delinquent fine. The patron could then pay his delinquent fine or renew his expired card, as the case may be, and the corresponding information is inputted from the keyboard or the display unit 6. The expired or delinquent file is updated on-line to allow the patron to proceed in checking out the desired items, as described above.

For the check-in mode, the patron merely presents the books he desires to check-in at the circulation desk. A separate check-in unit 8 may be provided in large libraries so that patrons desiring to check in a book need not wait in the check-out line. The book reader reads the book identification number which is then transmitted to the central processing unit which checks the number against the overdue file 32. If no match occurs, the book is not overdue and a confirm light is displayed at the console. For the patron the check-in procedure is complete. The computer, however, checks the reverse file 33 for a match. If the book is reserved, a reserve light is energized at the branch console, and the central computer immediately prepares a reserve notice on the printer 23. Thus, a reserve notice is prepared without manual intervention when a reversed book has been checked in. If the book is overdue, the overdue fine is display unit 6. Upon paying the fine, the overdue file is automaticaly updated. The operator merely depresses a PAID switch which indicates that the previously displayed overdue fine has been paid. The auxiliary file 36 may then be used to store the amount of fine for later bookkeeping purposes. If the patron does not pay his overdue fine, a CLEAR button provided on the console will automatically charge the patron's account. Such data is stored in the auxiliary file 36 for overnight transfer to the patron file 40. If the patron wishes to pay only part of his fine, the amount paid may be entered either using the keyboard of unit 6 or using a special pushbutton keyboard located directly on the Check-In console.

If the returned item has been damaged, the operator may enter a preselected fine or assess the damage and fine accordingly. A variable damage fine may be entered by the keyboard of the display unit 8, or a preselected fine may be recorded by means of a hardware DAMAGED switch on the console. In either case, the fine may be paid immediately or charged to the patron's accound as discussed above.

ON-SITE MINI-COMPUTER SYSTEM

FIG 1a shows a smaller version of the library circulation system which may be housed and used in a single unit library. The system comprises a mini-computer 50, an automatic send and receive keyboard 52, and interface 54 which connects the mini-computer to the I/O devices. These are an item reader 56, a patron card reader 58 and a console 60. The mini-computer 50 is the General Automation Model SPC-12 computer with 4K memory bytes. The keyboard unit is a standard ASR Model 33 teletype. A parallel line P connects the interface to the computer, whereas a serial bus S is provided for the standard computer/teletype interface.

Details of the card item reader together with the console and interface are sent out below. It is to be understood, however, that the card and item readers may employ either character or code recognition methods for either parallel or serial type readers. The identification coding may be done with magnetic ink, visible color coding, or infra-red coding. Corresponding optical and magnetic readers are presently known and available. The use of infra-red or magnetic coding is especially attractive in that it prevents patrons from purposely changing the code by marking on the label. Error checking features for properly reading the code may be easily incorporated into the computer software, by means of a parity check.

Although the mini-computer may be interfaced to on-line file units such as units 31-36, the present embodiment merely reserves regions of core member to store the various file data. The major limitation with the core file reserves is the lack of core memory particularly in small computers. Additional memory banks may be added as needed.

The operation of the mini-computer system is similar to that of the larger multi-branch library system. In this case, however, the reserve-hold notices are printed on the ASR unit 52 instead of the line printer 23. All of the features of the larger system, such as the reserve file check, overdue, delinquent and expired file check, are incorporated in the smaller mini-computer system.

MECHANICAL STRUCTURE

1, Consoles

Referring now to FIG. 2, a console 100 is seen with a cover member 102 having an opening 104 with an insert of black foam material 105 to receive an item reader 106 which is connected to the interior of the console by means of a strip cable connector 108. The connector 108 is a series of flexible cables connecting the various switching elements to be discussed below located in the reader to the appropriate circuitry within the console 100. A "Read Command" is initiated by a switch 109 on the side of the reader 106.

The left side of the Combination console consists of a Check-In portion 110 and a Check-Out portion 112. A toggle switch 114 determines whether or not the console is operating in a Check-In or Check-Out mode. A light 116 is used to indicate that the power is "on" in the Check-in position 110, while a light 118 functions in the same manner for the Check-Out portion 112.

The Check-In side of the console has a PAID button 120, a DAMAGED button 122 and a CLEAR button 124. Positioned below buttons 120-124 is a RESERVE light 126. To the left of the buttons and RESERVE light is an alpha-numeric display area 128 which includes seven elements 130 per numeral display. While two numerals are shown, on the console, it will be apparent that any number may be used to indicate the amount due as discussed below. a reasonable number would be four so that up to $99.99 may be displayed.

On the Check-Out side of the console, a patron's card 132 is seen positioned in a slot 134 in a card reader 136 also discussed below. A plurality of indicating lights 138, 140 and 142 are provided which correspond to COMFIRM, EXPIRED, and DELINQUENT states respectively.

FIG. 3 illustrates a Check-Out console 112', and FIG. 4 illustrates a Check-In console 110" similar to the right and left hand portions of the combination console in FIG. 2, respectively. In the discussion below, like numbers will be used where possible. This console has an area 105' for receiving a reader 106' connected by means of a strip cable 108'. A power indicating light 118' is positioned above the patron card reader 136' having a slot 134' therein. A plurality of CONFIRM, EXPIRED and DELINQUENT lights 138', 140' and 142' are positioned below the patron reader 136'.

In FIG. 4 a Check-In console reader 106" is seen in a reception area 105" and connected by a strip cable 108". A power-on light 116" is seen positioned above the AMOUNT DUE alpha-numeric display 128". The respective PAID, DAMAGED and CLEAR buttons are seen at 120", 122" and 124" while a RESERVE light is at 126".

2. Patron Card

A patron or user's identification means in the form of a card is seen at 132 in FIGS. 5 and 6. This card may be made of plastic material or other composition which is relatively stiff. The card may have indicia on it such as a patron's number 150, as well as a date of expiration located at 152. There is an area which may be positioned in the upper central portion at 153 which may or may not be depressed having the patron's name and address imprinted thereon. The depression would be used in the situation where the name and address is embossed. If it is desired to merely print in unembossed letters the name and address, then the depression will not be necessary. To the right side of the card is located a slot 154. The purpose of the slot 154 is for use as an actuating element for a switch on the patron's card reader as discussed below. An area 155 located below the name plate area 153 is provided with a plurality of circular positions 156 numbered "1-11" and positions 157 numbered "13-24". For the purpose of the instant disclosure, only those from "6-8" and "17-20" will be discussed. These locations would include the patron's identification number. The locations 156 and 157 may be punched out when used with a microswitch reader as in the instant disclosure. As will be seen below, the holes 156 will be used to retain the identifying data, while the holes 157 will be used for another switching function. One reason for the use of only four bits of information is for ease in illustration.

It will be obvious that optical reading may be used in place of switch actuation means. For an optical reader the areas 156 and 157 would be black or white in the same manner as the instant card has a hole or lack of a hole at a specific location.

3. Item Card

An item or book plate label 160, as seen in FIG. 7, is permanently affixed to the book or other item which is to be checked out of a library or the like. The plate may be formed of the same material as the patron card. The card is preferably shaped in the form of a trapezoid having a base at the top 162 wider than a base 164 at the bottom. A pair of converging sides 166 join the two bases. The purpose, as will be seen below, of the trapezoidal-shaped card is that when the reader 106 is slid onto the card in a longitudinal direction from base 164 toward base 162, easy alignment is achieved without positioning the reader perpendicular to the card. Misalignments are automatically remedied as the reader is slipped onto the card. An area 168 is provided for appropriate information as to the title and author of the book, as well as other library identifying information. There are a plurality of circular areas 170 located below the printed indicia area. For the purposes of the instant disclosure, only a four bit word will be used; therefore, it will be seen that areas 172 are darkened while area 174 is left white. In other words, since an optical reader will be used, and if one assumes black being a "1" and white being a "0", the word would be "1011".

4. Item card Reader

Referring now to FIGS. 8-10, the item card reader is generally seen at 106 having an upper portion 180 and a lower base portion 182. The base portion has a bottom 184 which has a recessed area 186 therein. The area 186 is trapezoidal-shaped having an opening 188 which is only slightly larger than the base 162 of the item card. The recess also has a smaller end 190 which is of about the same size as the smaller base 164 of the item card 160. The purpose of the shape, as discussed above, is obviously so that the reader may be slid over the item card and properly align the card within the reader. As seen in FIGS. 2 and 8, an actuating button 109 is positioned in a recess 191 on the side of the reader. The reader is provided with a plurality of optical sensors 192 potted in a block 194. These are aligned with black and white areas 172 and 174 on the item card. Again, for the ease of explanation, only four such sensors are illustrated. For purposes of a complete disclosure, an example of such sensors are those obtained from Skan-A-Matic Corporation, Skaneateles, N.Y., model S-322-3. They are used in conjunction with Skan-A-Matic model T-310-D amplifier-output drive circuit. A pair of brackets 196 may be used to attach the sensor block 194 to the reader.

5. Patron Card Reader

Figure 11A:
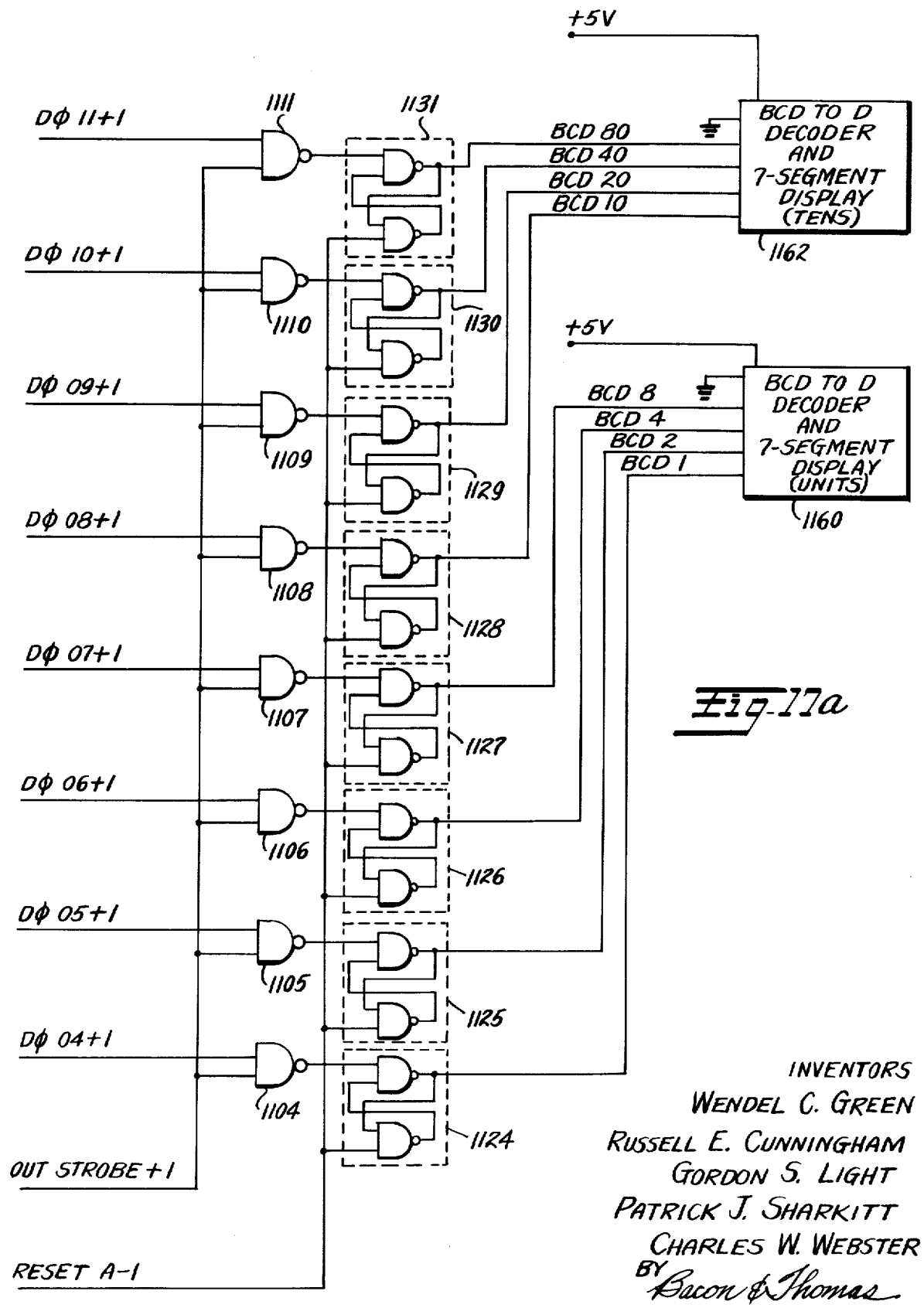
FIG. 11 is an exploded view illustrating the patron card reader with the patron card in its various positions inserted therein.
Figure 11B:
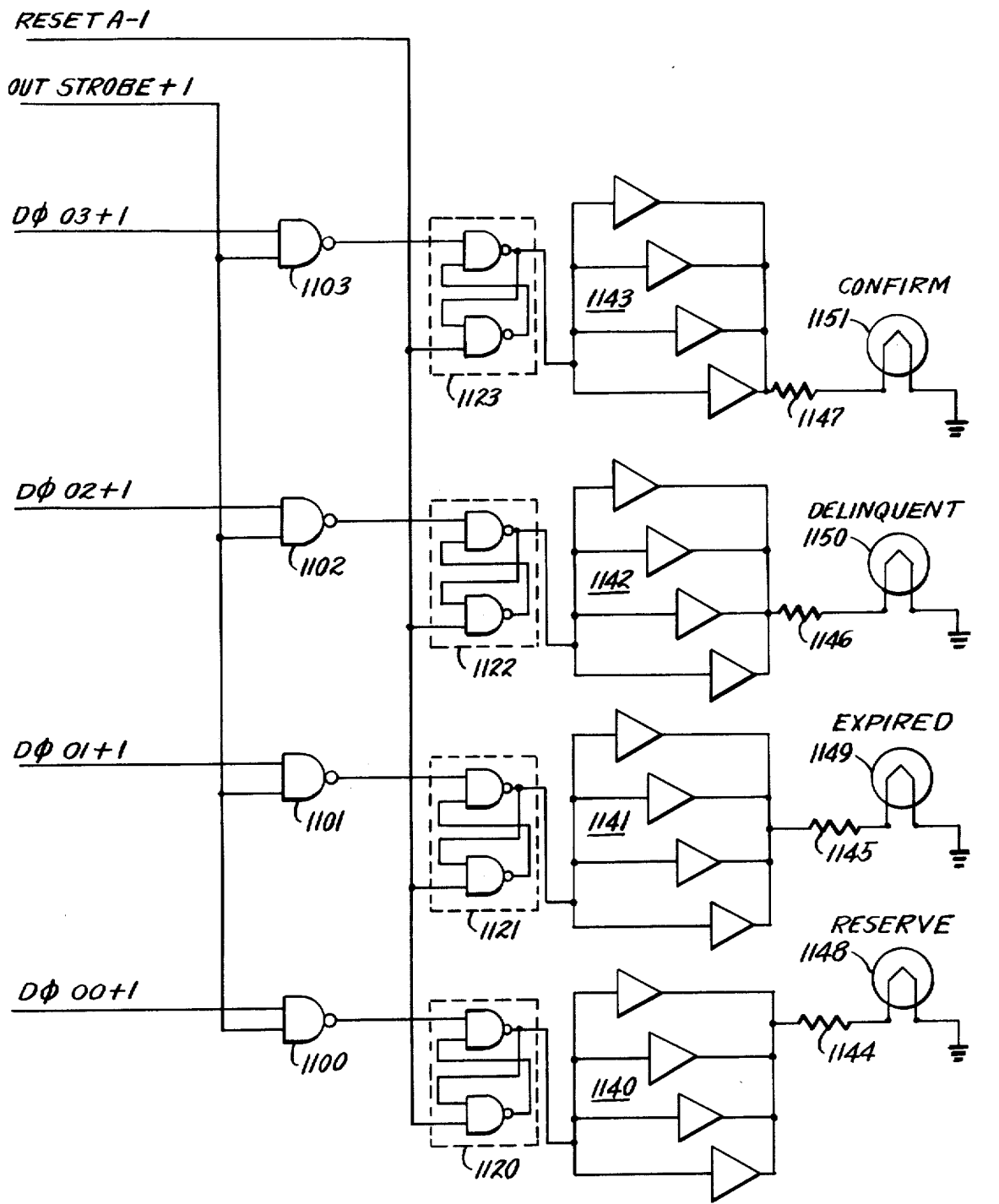

Referring now particularly to FIGS. 11-13, the patron card reader 136 has a bevelled opening in slot 134 therein for receipt of the patron card 132. As will be seen from the discussion below the card 132, which has one hole in line 156 punched through and four holes in line 157 punched through, is inserted to its "Initial position" and then may be depressed to its "Read Position".

A normally open microswitch 202 is mounted on the reader 136 by means of a bracket 204. The microswitch 202 has a ball 206 biased by means of a spring 208 for actuating the switch in cooperation with slot 154. When the card is inserted, the ball actuating element 206 is biased rearwardly to close the switch. As soon as the slot 154 reaches the ball 206, the switch will again open. At this point, the on-off relationship is actually superfluous. The switch is primarily used upon completion of the transaction since the unit will be cleared as the card is pulled out by the closing and then opening of the switch 202.

Also seen in FIG. 13 is a spring biased switch 210 having a shaft member 212 with a flange 214 thereon. A spring 216 is received in an opening 218 for continually biasing an upper portion 220 into contact with a leaf spring arm 222. The leaf spring arm 222 extends into the interior of the patron card reader so that as the card is pushed all the way to the bottom of the slot 134, the leaf spring will push the shaft 212 downwardly closing the circuit between contact elements 224. Also positioned within the reader housing 136 are a pair of springs 226 which are received in slots 228. Positioned on the upper end of the springs 226 are a pair of blocks 230 to assist, together with the leaf spring 222, in returning the card 132 to its outward position. Finally, a dust collecting slot 231 is located at the base of slot 134 to prevent the device from becoming inoperative due to a small amount of dirt accumulating in the bottom thereof.

Referring now to FIG. 12, a plurality of microswitches 232 are seen with ball actuators 234 spring biased by means of spring elements 236. These switches are located along a line 238 in FIG. 11. Obviously, other types of switch actuators may be used in conjunction with switches 202 and 232.

In operation, the card 132 is inserted into the slot 134 and will come to rest on the blocks 230. At this time the spring biased microswitches 232 have their ball elements 234 resting within the punched out holes 157. Since the switches 232 are normally open, there will be no output from the switches in this "Initial Position". As the card is further depressed to its "Read Position" and the switch 210 is actuated by the depression of the leaf spring 222, the microswitches 232 will register with those holes 156 which are punched out of the card 132. In the example shown, only one hole is punched out; therefore, using the convention of a hole equalling a "1" and a non-hole equalling a "0", the output will be "0010".

As indicated above, when card 132 is removed a "Clear" function will be given to the computer by microswitch 202.

OPERATION OF THE CHECK-OUT AND CHECKIN CONSOLES

In operation, it will be appreciated that the console seen in FIG. 2 is a combination of the consoles illustrated in FIGS. 3 and 4.

1. Check-Out

The process of checking out items does not greatly differ from existing practices in libraries except in that the patron brings the various items to the check-out desk and presents his patron card 132. The card is inserted into slot 134 in patron card reader 136 and a series of checks are made. Assuming that the card is not expired or that the patron is not delinquent, the CONFIRM light 138 will be turned on by the computer. The library aid then takes the item reader 106 and places it on the item card 160 by sliding it over the trapezoidal-shaped card so as to locate the scanning elements 192 over the data areas 172 and 174. It will be appreciated that since the item is optically scanned, the process automatically builds up a circulation file record of the items checked out. A pre-dated due date slip can be inserted into each item checked out by the library aid. This insert is not shown in the drawings but is merely provided as a convenience to the patron. There is no limit to the number or category of items which can be charged out to a patron except as may be directed by library policy. The library aid scans each book as indicated above by sliding the reader onto the item card and pressing the button 109 to initiate the reading. The data emanating from the card via the scanners 192 is transmitted through line 108 to the console wherein the combination of information from the patron card 132 and the item card 160 is recorded in the computer memory.

The above discussion has assumed that there were no delinquent items or that the card was not expired. When the patron card is inserted, the DELINQUENT indicator 142 on the console may be activated. This indicates that a patron's account has exceeded some predetermined limit established by the library. Simultaneously, with the activation of the DELINQUENT indicator 142, a message will be displayed on the input/output terminal. This message could consist of, for example, unpaid accrued fines, damage cost of returned books, books overdue and not returned, etc. If the library is to refuse any further privileges to the patron until the delinquent condition is resolved, the supervisor at the desk can discuss the situation with the patron. As in the case with a routine check-out, removal of patron card 132 from reader 136 closes the particular transaction. If the delinquency is satisfactorily resolved, the supervisor clears the account by entering appropriate data into the system by means of the input/output terminal. The aid can then complete a routine check-out of the desired items.

The third management control condition included is the expiration of the patron's card. If this condition is met, the EXPIRED indicator 140 on the console is activated. The life of a general patron registration card would be established by library policy. The situation for handling such expiration could require immediate renewal, the granting of interim or limited privileges, or some other library-directed control. In any case, as with delinquent patrons, removal of the patron card 132 from the reader 136 closes the transaction. If the condition is resolved, the supervisor reactivates the account by entering the appropriate data into the system by means of the input/output terminal. The aid can then complete a routine check-out of the desired items as previously discussed.

2. Check-In

When an item is returned, the item reader 106 is used to record the card 160 affixed to each item. The patron's card 132 is not required for checking in; therefore, the book or other item can be returned by the patron to any branch or placed in a book drop.

During the check-in process, one of several conditions will possibly occur, either singly or in any combination. These are as follows:

1. If the book is overdue, an accumulated amount figure will appear in the assessment indicator 128 on the console. If the patron is present at the time the book is checked in and pays the assessment, the library aid then depresses the PAID button 120. The patron's record is then cleared, the branch account is credited with the indicated amount, and the console is cleared for the next transaction. If the assessment is not at that time paid, the depressing of the CLEAR button 124 will not only charge the patron's account with the indicated assessment, but will also clear the console for the next transaction as well as cause the automatic creation of an assessment notice for mailing to the patron.

2. If someone has requested the book, it is to be placed on "Reserve". A scanning of the "Reserve File" automatically takes place as each item card is read. If the item has been reserved, regardless of the branch at which the reserve has been entered, the RESERVE indicator 126 is activated. At essentially the same time (or at a later time), a Reserve Notice will be automatically prepared at the central site to be mailed to the patron informing him that his title is now available and being held for him. In the case of multiple reserve requests for the same title, the first individual requesting the item will be notified.

3. If the item being returned has been damaged, two separate considerations are possible. One is applicable to items other than records and films and the second is applicable to records and films. In the case of the first group, one of three conditions can be established and these are totally dependent upon the library policy. The choices are as follows:

A. Pre-set damage assessment—a set dollar figure, such as $1.50, will be charged regardless of the actual amount of the damage. This necessitates the use of only one indicator and one circuit, as well as minimal decision possibilities. This assessment of $1.50, for example, will appear on the console at 128 (actually on three such blocks instead of the two shown).

B. Variable damage assessment—a system comparable to a touch tone telephone in which the variable amount ranging from $0.01 to $99.99 can be entered as appropriate. This too may appear on the alpha-numeric indicator 128.

C. Pre-established damage range assessment—a system that provides a choice from among pre-established values such as $1.00, $2.00 and $3.00. The choice of the range can be as small or as large as desired but is limited to the established values. This figure may also appear on the alpha-numeric readout.

The process of determining damage assessment would be accomplished during the regular check-in procedure with the determined assessment being keyed into the system by depression of the appropriate key or keys concerned. As the case of overdue situations, an accumulated amount will appear in the assessment indicator as indicated above at 128. If the patron is present and pays the assessment, a depression of the PAID button 120 will credit the amount to the appropriate account and clear the console for the next transaction. If the assessment is not paid, depressing of the CLEAR button 124 will not only charge the patron's account with the indicated amount but will prepare the system to accept the next transaction and will also automatically create an assessment notice for mailing to the patron.

In the case of records and films, the normal check-in should be recognized as being conditional only. While receipt is acknowledged, the question of damage assessment can only be determined after-the-fact when the item or items are evaluated by a visual/audio process. As such, any damage assessment entries are made to the system after the patron has departed. If desired, it is possible to automatically create an assessment notice for the damage to be mailed to the patron, dependent upon library policy for these particular items.

INTERFACE CIRCUIT

Figure 14:
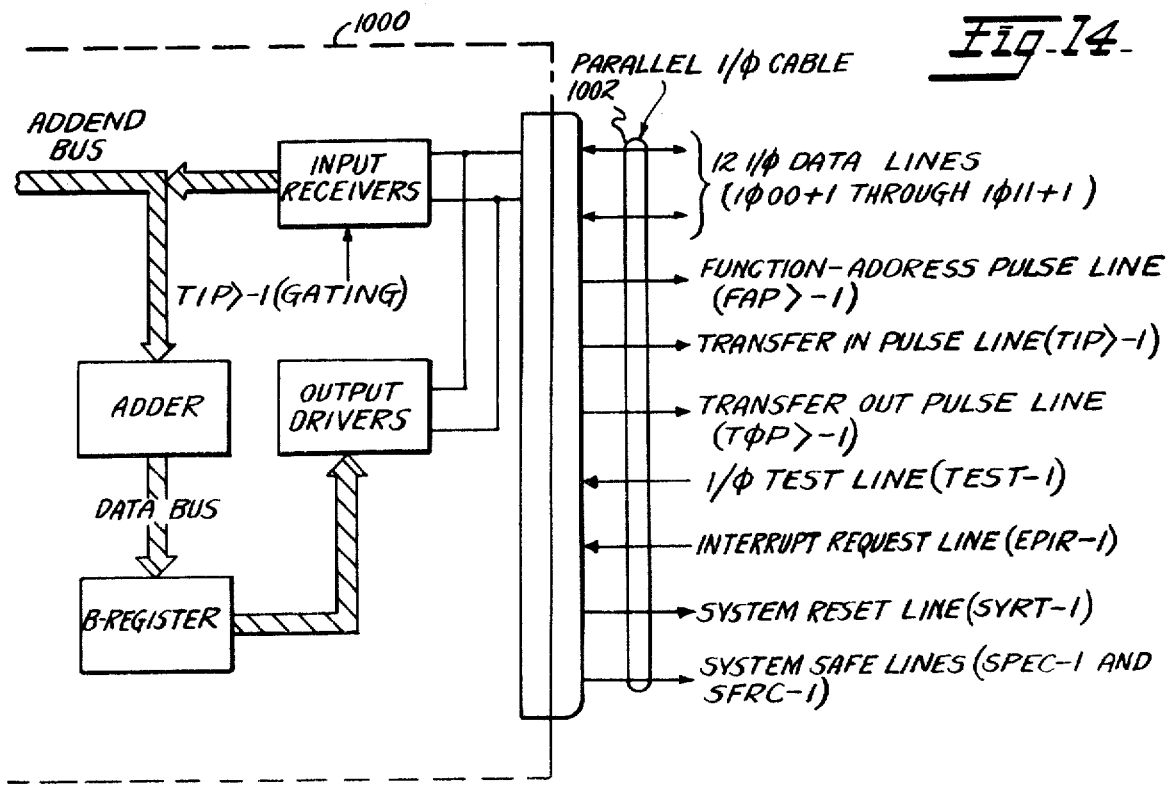
FIG. 14 is a diagram of the parallel I/O bus connecting the computer and interface.

FIG. 14 illustrates the programmed computer and its input and output lines for connection to the interface. The computer 1000 in this embodiment is a General Automation Model SPC-12 computer, programmed according to the program given in Appendix A of this specification. These computers are well-known and are widely available on the open market. Other computers could be used, with appropriate modiciations to the program. The internal functioning of this computer, except as it is controlled by the disclosed program, is well-known and does not require further explanation. The computer 1000 receives and sends all of its input and output signals from and to the disclosed interface via a parallel input/output cable 1002 containing the illustrated signal lines. These lines include twelve input/output data lines numbered $I\phi00+1$ through $I\phi11+1$, a function-address pulse line $FAP>-1$, a transfer-in-pulse line $TIP>-1$, a transfer-out pulse line $T\phi P>-1$, an interrupt-request line EPIR-1, and other lines which are not used in the disclosed embodiment.

It should also be noted that the SPC-12 computer has a serial input/output bus which is used to drive the teletypewriter 58 via a standard interface provided by General Automation for use in connection with the SPC-12 computer.

In the signal names given in this description, referring to the preferred embodiment, in the case of data signals (as $DI00+1$ or $D\phi03+1$), the suffix "+1" indicates that an 0-volt signal is a binary zero, and a positive-voltage signal or an open line is a binary one. In the case of control signals (as EPIR-1 or RESET-1), a suffix "+1" indicates that the signal has its functionally active state as a positive voltage. However, with the SPC-12 computer control signals with positive voltages represent binary zero, and control signals at 0 volts represent binary one. The suffix ">1" indicates a signal which is effective as a positive-going pulse.

Figure 15:
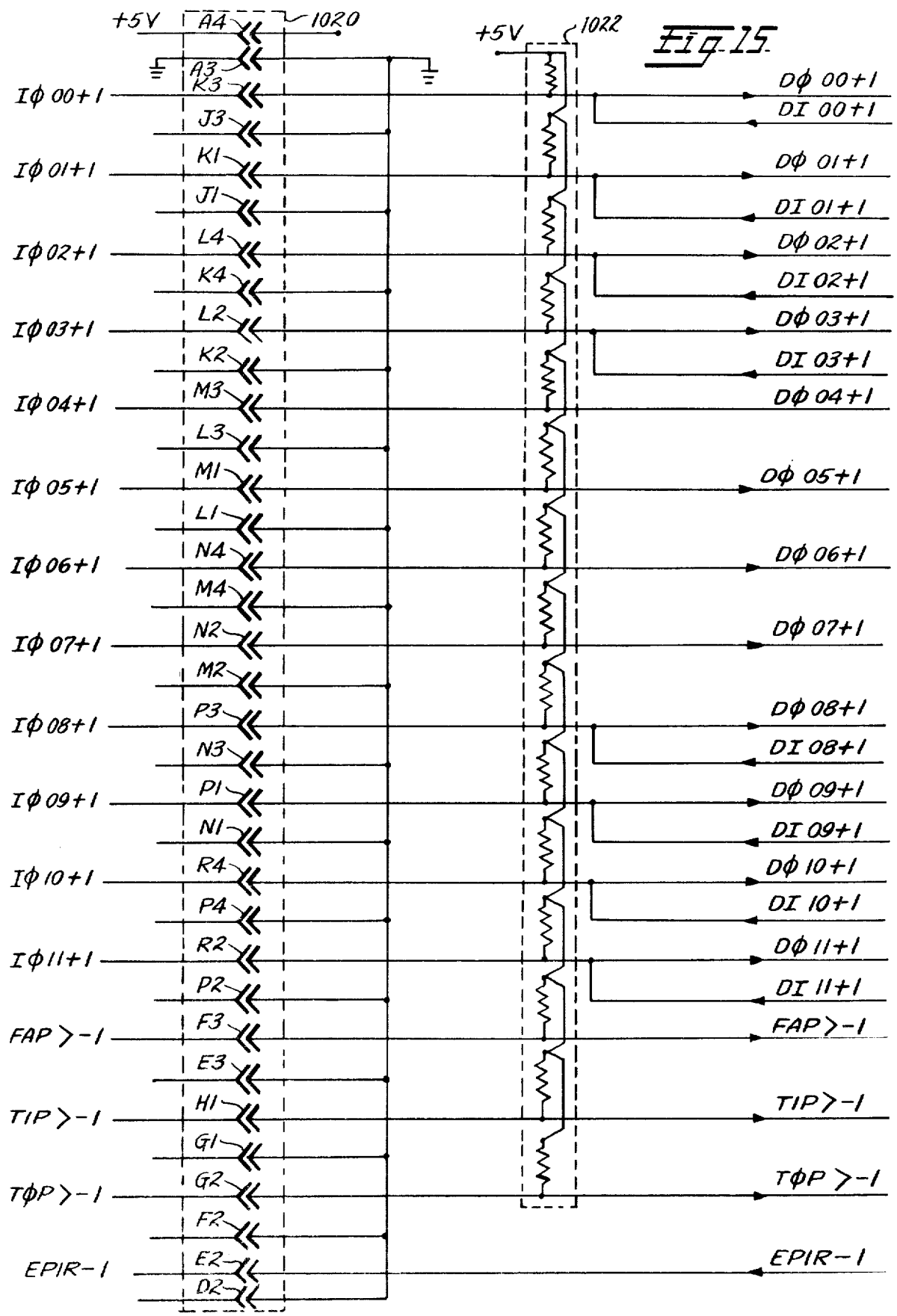
FIG. 15, 16, 17a, 17b, 18 are schematic diagrams of the interface circuitry.

FIG. 15 represents the connection point between the computer and the interface unit, with the computer being generally to the left of element 1020 and the interface unit being to the right, as drawn. Element 1020 is a mating connector of the type conventionally used with the SPC-12 computer, and is manufactured by Molex Products Company as their part 1725-P60. The letter-numeral combinations shown within the connector element 1020 represent the standard pin numbers on these connectors. Certain of the output values, such as those from connection points J3, J1, K4, etc. are not used and are illustrated as being interconnected to ground at terminal A3. The signal values which are used, $I\phi00+1$ through $I\phi11+1$, $FAP>-1$, $TIP>-1$, $T\phi P>-1$, and EPIR-1 are those signals illustrated in general in connection with FIG. 14.

Since the output points on this computer are open-collector transistors, resistor network 1022 provides a group of 390-ohm resistors connected at one end to the signal line and at the other end to a source of +5 volt potential, for the purpose of pulling up the output to obtain sufficient current to drive the output load. The signals $FAP>-1$, $TIP>-1$, $T\phi P>-1$, and EPIR-1 are connected directly through to provide output signals labelled the same. The input/output signals $I\phi00+1$ through I$\phi$11+1 provide data-output signals D$\phi$00+1 through D$\phi$11+1 on each line. Additionally, provisions are made in this interface for data-input signals to be returned over eight of the lines as signals DIoo+1 through DI03+1 and DI08+1 through DI11+1.

The primary purpose of this interface is twofold:

(1) to provide a 12-bit input word (see FIG. 19) to the computer so that the computer can use each bit position to decode the information it contains, and (2) to accept a 12-bit output word (see FIG. 19) from the computer and direct the appropriate bits to control specific pieces of output hardware.

The interface operates in accordance with the standard SPC-12 input/output interface instructions. Three types of program instructions provide control of the I/O system. One type of program instruction (DOB) transfers data from the computer to the I/O device. Another type of program instruction (DIB) transfers data from the I/O device to the computer. The third type of program instruction (POB) is used in both input and output modes and effectively addresses the I/O device and specifies the function to be performed. An FOB instruction is generated along with a 12-bit Function Address Word. A Function Address Word precedes each data transfer word. The Function Address Word is in a format as follows: bits 0–5, corresponding to data-out lines D$\phi$00+1 through D$\phi$05+1, represent the address of specific I/O device; bits 6 and 7, corresponding to data lines D$\phi$06+1 and D$\phi$07+1, represent either the input mode (where D$\phi$07+1=1 and D$\phi$06+1=o) or output mode (where D$\phi$07+1=O and D$\phi$06+1=1); bits 8–11 are not used.

When data is transferred into or out of the computer, the Function Address Word is transmitted to the interface logic together with control FAP>-1 pulse. Following this step, the 12-bit data word is transmitted together with either a TIP>-1 pulse for an input mode (into the computer) or a T$\phi$P>-1 for an output mode.

Figure 16:
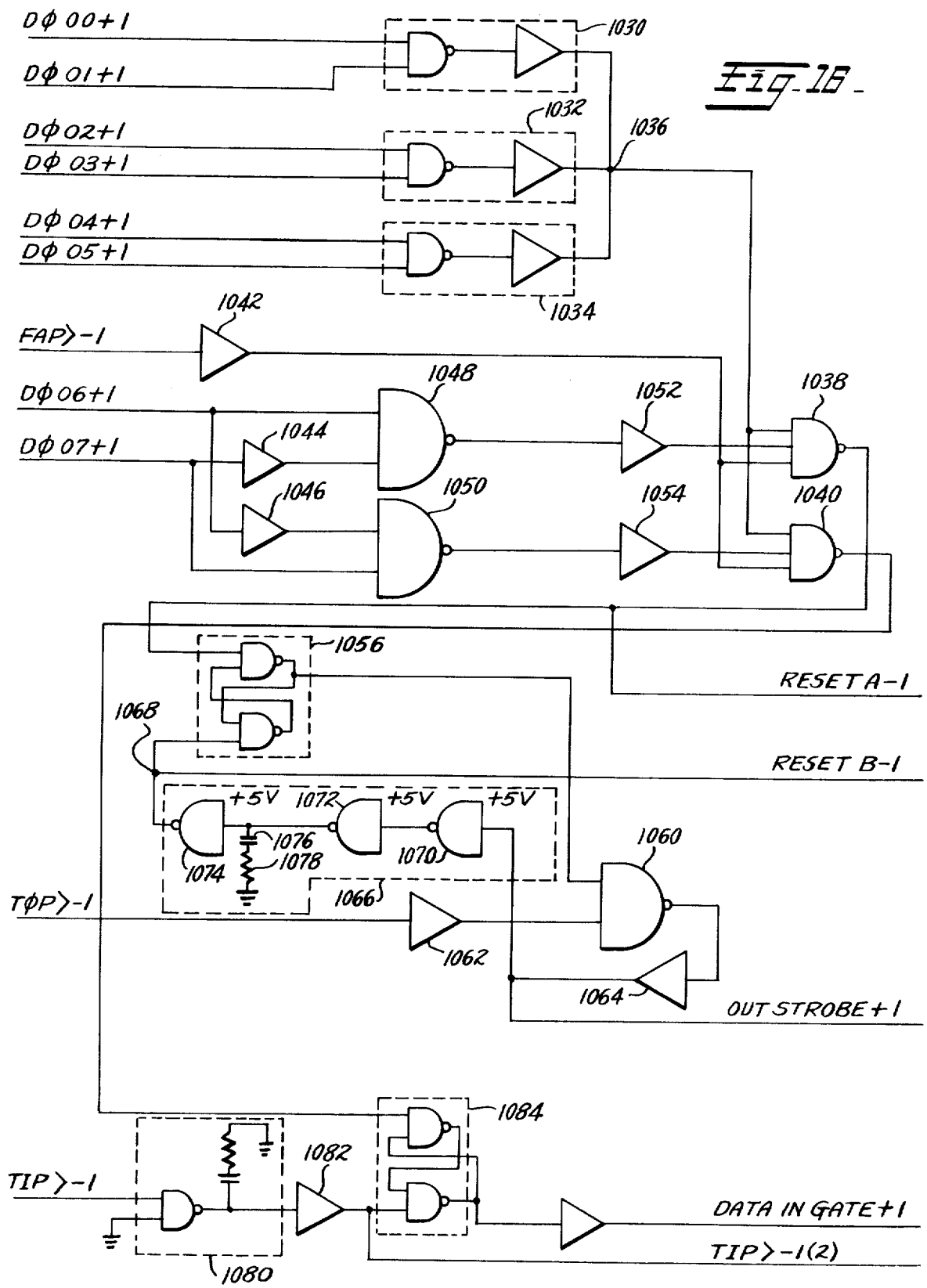

FIG. 16 illustrates the portion of the interface circuitry used for deriving timing signals from the output signals from the computer. Signals D$\phi$00+1 and D$\phi$01+1 are applied to the inputs of an AND circuit 1030, which is made up of a NAND circuit with an inverter connected to its output. Similarly, input signals D$\phi$02+1 and D$\phi$03+1 are connected to the inputs of AND circuit 1032, and input signals D$\phi$04+1 and D$\phi$05+1 are connected to the inputs of AND circuit 1034. The outputs of these AND circuits are connected together at point 1036 to provide an output signal which remains high (binary one) only so long as the output of each of invertors 1030, 1032 and 1034 is high. Otherwise point 1036 carries a zero. The output of point 1036 is applied to one input terminal each of NAND gates 1038 and 1040. Thus, unless each signal D$\phi$00+1 through D$\phi$05+1 is a binary one, the output at point 1036 is a binary zero. Otherwise, it is one. An additional input to each of NAND gates 1038 and 1040 is provided by applying the function address pulse signal FAP>-1 to an invertor 1042, the output of which is applied to each of the two NAND gates. The signals D$\phi$06+1 and D$\phi$07+1 are applied directly and respectively inverted by invertors 1044 and 1046 to the respective NAND gates 1048 and 1050. The signals from NAND gates 1048 and 1050 are respectively inverted by invertors 1052 and 1054 and applied to the respective third inputs of NAND gates 1038 and 1040.

The output from NAND gate 1038 is called the Reset A-1 signal and is applied directly to one input of a flip-flop 1056 and is also available as an output signal from the subsystem. All of the flip-flops in the preferred embodiment are constructed of cross-countered NAND gates, as illustrated in the drawing. The Q signal from flip-flop 1056 is applied to one input of a NAND gate 1060. The transfer-out pulse T$\phi$P>-1 signal, applied through an inverter 1062, is applied to the other input of NAND gate 1060.

The output of NAND gate 1060 is applied through an invertor 1064 to provide the OUT STROBE +1 signal. The output of invertor 1064 is also applied to a delaying pulse stretcher 1066 to provide a delayed pulse signal RESET B-1 to reset flip-flop 1056. The RESET B-1 signal is also available as an output from the subsystem. The pulse stretcher is constructed of three NAND gates 1070, 1072, and 1074 connected in series, with a 0.001 microfarad capacitor 1076 and a 470 ohm resistor 1078 connected in series to ground between the second and third NAND gates. The unused terminals of the three NAND gates are connected to a source of +5 volts or left open.

The transfer-in pulse TIP>-1 is applied to the input of a delaying pulse stretcher 1080 to provide a stretched signal for application to an invertor 1082. The inverted stretched signal is applied to the RESET terminal of a flip-flop 1084, and also to an output line TIP>-1 (2). The set signal for flip-flop 1084 is provided by NAND gate 1040.

Thus, it is seen that the transfer-out pulse T$\phi$P>-1 and the transfer-in pulse TIP>-1 are used to determine whether data will flow into or out of the computer on the 12-bit parallel data lines. The OUT STROBE +1 signal is generated under control of the transfer-out pulse, to cause data to be transferred out of the computer. The DATA IN GATE +1 signal is generated under control of the transfer-in pulse to cause data to be transferred into the computer.

In operation, the AND gates 1030, 1032 and 1034 with their outputs connected at point 1036 serve as an address decoder, which specifies the particular I/O device being used. In the preferred embodiment only one I/O unit is employed, namely the console. The code selected to address the console corresponds to settings bits 0–5 of the Function Address Word to 1, i.e., octal 77. Thus, point 1036 will be a binary one only when every data line D$\phi$00+1 to D$\phi$05+1 is a binary one. Upon occurrence of FAP>-1 pulse together with the proper Function Address Word, NAND gate 1038 furnishes a reset pulse, RESET A-1, to reset the flip-flops associated with the seven-segment output display and output indicator lights.

In the input mode, the signal from gate 1040 triggers the DATE IN GATE +1 pulse via flip-flop 1084. This DATA IN GATE +1 signal is used to gate the data being read by the 4-bit reader, as well as to gate the signal generated by pressing the CONTROL, DAMAGE, COLLECTED and CLEAR switches. The TIP>-1 signal resets the flip-flop 1084, and is delayed to provide the TIP>-1 (2) signal which resets flip-flop 1224. In the output mode, the signal from gate 1038 is stored in flip-flop 1056 and used as one input to NAND gate 1060. The T$\phi$P>-1 pulse which is generated upon transferring the 12-bit output data word, then provide the second input to NAND gate 1060 to produce the OUT STROBE +1 signal. The OUT STROBE +1 signal gates the output signals to the seven-segment display flip-flops as well as to the output lamps. The purpose of the delay circuit 1066 is to reset the flip-flop 1056 after the strobing signal has been sent, and to provide a second, delayed reset signal, RESET B-1 to reset the flip-flops in the CONTROL, DAMAGE, PAID and CLEAR circuits.

FIGS. 17a and 17b illustrate the use of output information from the computer by the console, and the interface for directing the output information to the appropriate location on the console. Data output signals D$\phi$00+1 through D$\phi$11+1 are applied respectively to one input each of NAND gates 1100 through 1111. The OUT STROBE +1 signal is applied to the other input of each of the NAND gates 1100 through 1111 to gate the signals through only when the lines contain output signals. The output signals from NAND gates 1100 through 1111 are respectively applied to the SET input terminals of flip-flops 1120 through 1131. The RESETA-1 signal is applied to the respective RESET terminals of flip-flops 1120 through 1131.

The SET output signals from flip-flops 1120 through 1123 are respectively applied to fan-out invertors 1140 through 1143 (to provide sufficient power), to respectively provide current through limiting resistors 1144 through 1147 to indicator lights 1148 through 1151. Indicator light 1148 indicates that a returned book has been requested to be reserved. Indicator light 1149 indicates that a library card has expired. Indicator light 1150 indicates that the borrower is delinquent in paying money owed to the library. Indicator light 1151 confirms that the prospective borrower has neither an expired library card nor a delinquent account, and accordingly can borrow the requested book.

The SET output signals from flip-flops 1124 through 1131 represent the binary-coded decimal information to be displayed on the seven-segment display positions on the console. The outputs from flip-flops 1124 through 1128 represent the units position of binary-coded decimal information, and have their output signals applied to a unit BCD to D decoder and seven-segment display 1160. Integrated circuit units for converting from binary-coded decimal to decimal information and for displaying this information on a seven-segment display are well-known and widely available. Correspondingly, the output information from flip-flops 1128 through 1131 is applied to the inputs of a ten-position BCD to D decoder and seven-segment display 1162. Both seven-segment display positions are located on the console unit of the system.

FIG. 18 discloses the data input system for deriving data at the console and applying it back to the input of the computer. The four-bit signal from the sensor in the console reads the data from the $2^0$, $2^1$, $2^2$ and $2^3$ positions and applies these signals respectively as sensor $2^0$ signal to invertor 1200, sensor $2^1$ signal to invertor 1202, sensor $2^2$ signal to invertor 1204, and sensor $2^3$ signal to invertor 1206. The signals from these invertors are respectively applied to one input each of NAND gates 1210, 1212, 1214, and 1216. The DATA IN GATE +1 signal is applied to the other terminal of the respective NAND gates 1210, 1212, 1214, and 1216 to gate through the four sensor signals to provide respectively the data-in signals DI08+1, DI09+1, DI10+1, and DI11+1.

The control switch 1220 on the console applies ground potential selectively to either the SET or RESET input terminal of a flip-flop 1222, but is normally in the spring-biased UP position, as illustrated.

The two outputs from the flip-flop 1222 are applied to the J and K inputs of a dual J-K flip-flop 1224. Flip-flop 1224 may be of the type sold as an integrated circuit by Motorola as Dual J-K Flip-Flop (Common Clock), type MTTL MC 523. The stretched transfer-in pulse TIP>-1(z) is applied to the RESET terminal of the flip-flop. The clock terminal is grounded. The output signal is derived from the so-called $\overline{Q}$ output terminal and is called a NOT Q signal.

Four NAND gates 1230, 1232, 1234, and 1236 have their output terminals wire-NORed together at point 1238 to provide an output signal EPIR-1 whenever there is any data at the console ready to be fed into the computer. One input of each of the NAND gates 1230, 1232, 1234, and 1236 is either tied to a +5 volt signal or (not illustrated) left open. The $\overline{Q}$ signal is applied to the other input of NAND gate 1230.

The CONTROL switch flip-flop 1222 also provides one of its outputs, as illustrated, to one input of a NAND gate 1242, the other input of which is obtained from the DATA IN GATE +1 signal. The output from NAND gate 1242 is the DI00+1 50 signal to the computer, indicating the function of the CONTROL switch.

A DAMAGE switch 1246 is normally spring-biased into an UP position, where it provides a ground signal (binary zero) to the input of an inverter 1248, the binary one output of which is applied to one input of a NAND gate 1250. When the switch 1246 is pressed, the signal from invertor 1248 to gate 1250 becomes a binary zero, while the (binary zero) ground signal from the switch is applied to the SET terminal of a flip-flop 1252, which is inserted to overcome the effect of switch bounce. The resulting binary one output from the flip-flop 1252 is applied to the other input of NAND gate 1250 and held. When the switch is released, invertor 1248 again applies a binary one to gate 1250, thereby providing a signal to SET a storage flip-flop 1254 when the switch has been pressed. The output from flip-flop 1254 is applied to the signal input terminal of NAND gate 1232, as previously discussed. The inverted output from flip-flop 1254 is applied to one input of an additional NAND gate 1256. The other input of gate 1256 is connected to DATE IN GATE +1 signal, thereby to gate into the computer the DAMAGE signal, labelled DI03+1, as derived from DAMAGE switch 1246. Flip-flop 1252 can, of course, be reset, along with all of the switch bounce flip-flops, by the signal RESET B-1.

The PAID switch 1260, normally biased in an UP position, is shown connected to an inverter 1262, a NAND gate 1264, two flip-flops 1266 and 1268, and an output NAND gate 1270, all of which are analogous in structure and in purpose to those elements used in connection with the damage switch. The output from NAND gate 1270 is the input signal to the computer labelled DI02+1, indicating the condition of the PAID switch.

The CLEAR switch 1274 is shown connected to an invertor 1276, a NAND gate 1278, two flip-flops 1280 and 1282, and an output NAND gate 1284, all analogous to those used in connection with the damage switch. The output from NAND gate 1284 is the signal DI01+1, providing an input signal to the computer indicative of the condition of the CLEAR switch 1274.

FLOW CHART

The flow chart discussed below is designed for use in programming a computer to perform the documentation and inventory functions of the instant invention. The program given in the Appendix was written using the flow chart as a guide. In the interest of clarity and conciseness the program was designed to process for patrons and twelve books, and uses in-core storage of files instead of disc and tapes storage. The program assembly language is that used in the General Automation SPC-12 Computer.

Figure 19:
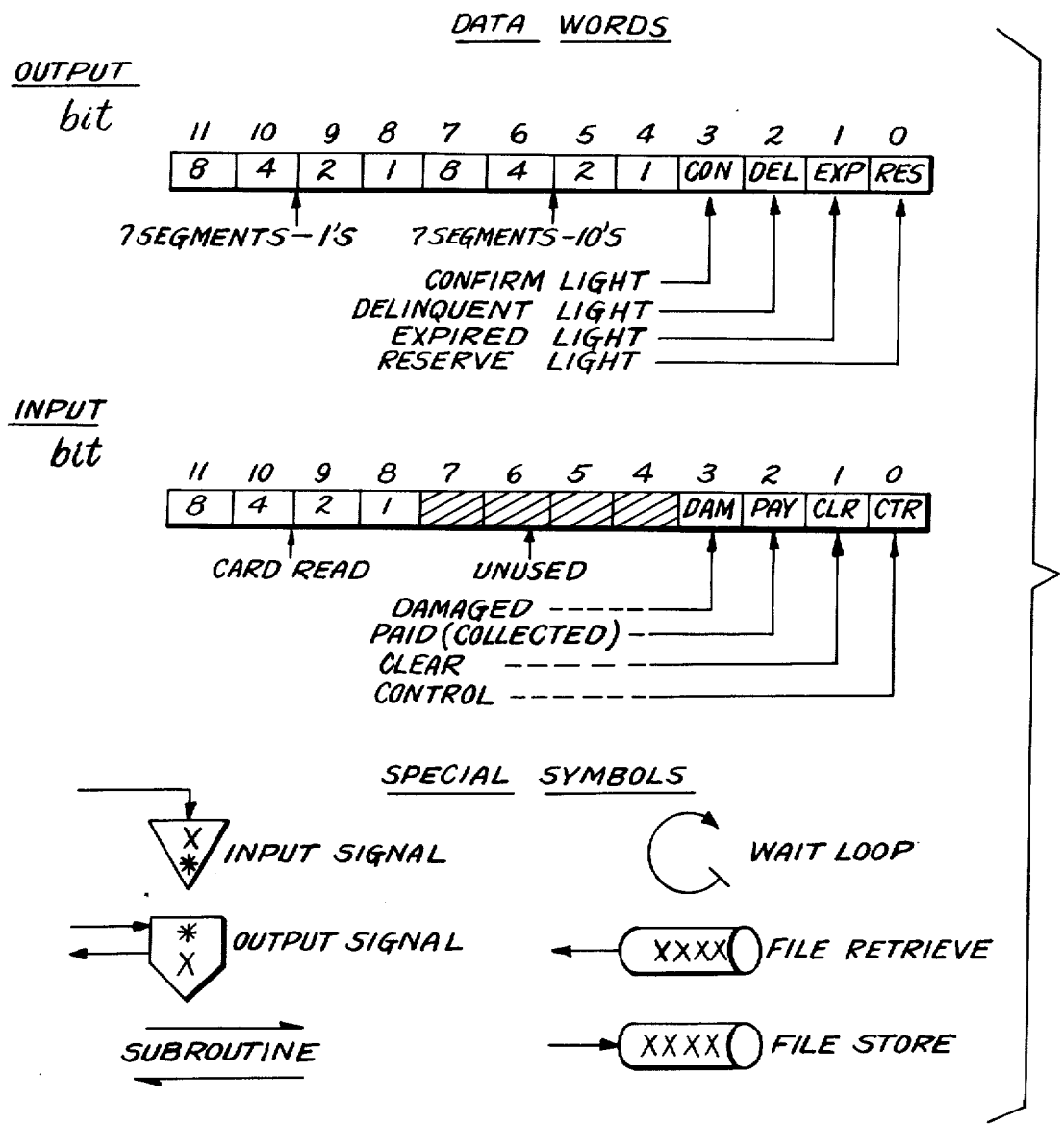
FIG. 19 illustrates the 12 bit input and output word formats together with the defining symbols used in the flow chart.

FIG. 19 defines the symbols used in the flow chart for the computer program ADCIS (Automatic Document Control and Inventory System). The input and output symbols refer to setting the indicated bits in the input and output words. The format for these twelve bit words is also shown in FIG. 19. Thus,

symbolizes an output signal which sets bit 3, the CONFIRM bit, which results in the turning on of the CONFIRM light on the console. The Wait Loop is simply a NO-OP cycle, which waits for a program interrupt. The "in" and "out" file arrows correspond to storage and retrieval. An exit to a subroutine returns to the point of exit.

Various file units are accessed for storage or retrieval of information. These files are shown in FIG. 20 together with the type of information stored.

The flow chart appears in FIGS. 21 through 32. The overall system is shown in FIG. 21. The computer sits in a Program Wait Loop until a hardwire process interrupt is received. For example, a patron may wish to check out a book. The patron card placed in the card reader will activate bit zero, the control bit, of the input word and provides a Process Interrupt signal. Mode Select A represents the step-by-step interrogation process which establishes where the interrupt occurred. (1) . . . (5) are the five possible branches of the flow chart corresponding to various bit settings of the input word. These branches are shown in FIGS. 23, 24, 25, 26 and 27.

While Mode A allows the console and reader (both card reader and item reader) to input data to the computer, it is also possible for the teletype to provide input data using Mode B of the program. Mode B is entered through the Teletype Wait Loop by depressing the CLEAR switch on the console three consecutive times. Any of the routines (6)–(11) may then be executed by the operator simply by depressing the key corresponding to the first letter of the routine name. For example, a new patron's name, address and identification number may be entered by hitting the letter "N" and a bad card may be purged by striking "B" and then entering the patron identification number. Throughout the flow chart the "exit" steps brings the program back to the Program Wait Loop.

FIG. 22 shows a more detailed step process for Mode Select A. Bits 8–11 in the input word carry the binary number of either the patron or the item. When the control bit is set to 1, the patron or item number is read. In the book reader the control button 109 is depressed by the operator, whereas in the patron card reader switch 210 is set automatically upon insertion of the patron card. Thus, after a Process Interrupt the first logical decision is to determine whether the CONTROL bit is set. If it is set, the data bits are read and the non-zero number is carried to the PC Subroutine. The PC Subroutine is shown in greater detail in FIG. 32, but basically it is used to decide whether the data number read is an item number or a patron number. The four patrons are assigned identification numbers 1–4, and the twelve items numbers 5–16. Thus, if the number is greater than five, it is an item number; if not, it is a patron number. The teletype is used to print the word "item" or "patron" followed by the data number. After coming out of the Subroutine PC the program enters the Patron Mode (1), corresponding to a data number less than 5 or the Item Mode (2), corresponding to numbers greater than or equal to 5.

If the control bit is not set, Mode Select A of the program checks sequentially the CLEAR bit, PAID bit and DAMAGED bit. If any of these bits are set, the program enters into the corresponding routine (5), (3) or (4). If the CLEAR bit is depressed 3 times in a row, the program enters Mode Select B for input via the teletype.

Figure 23:
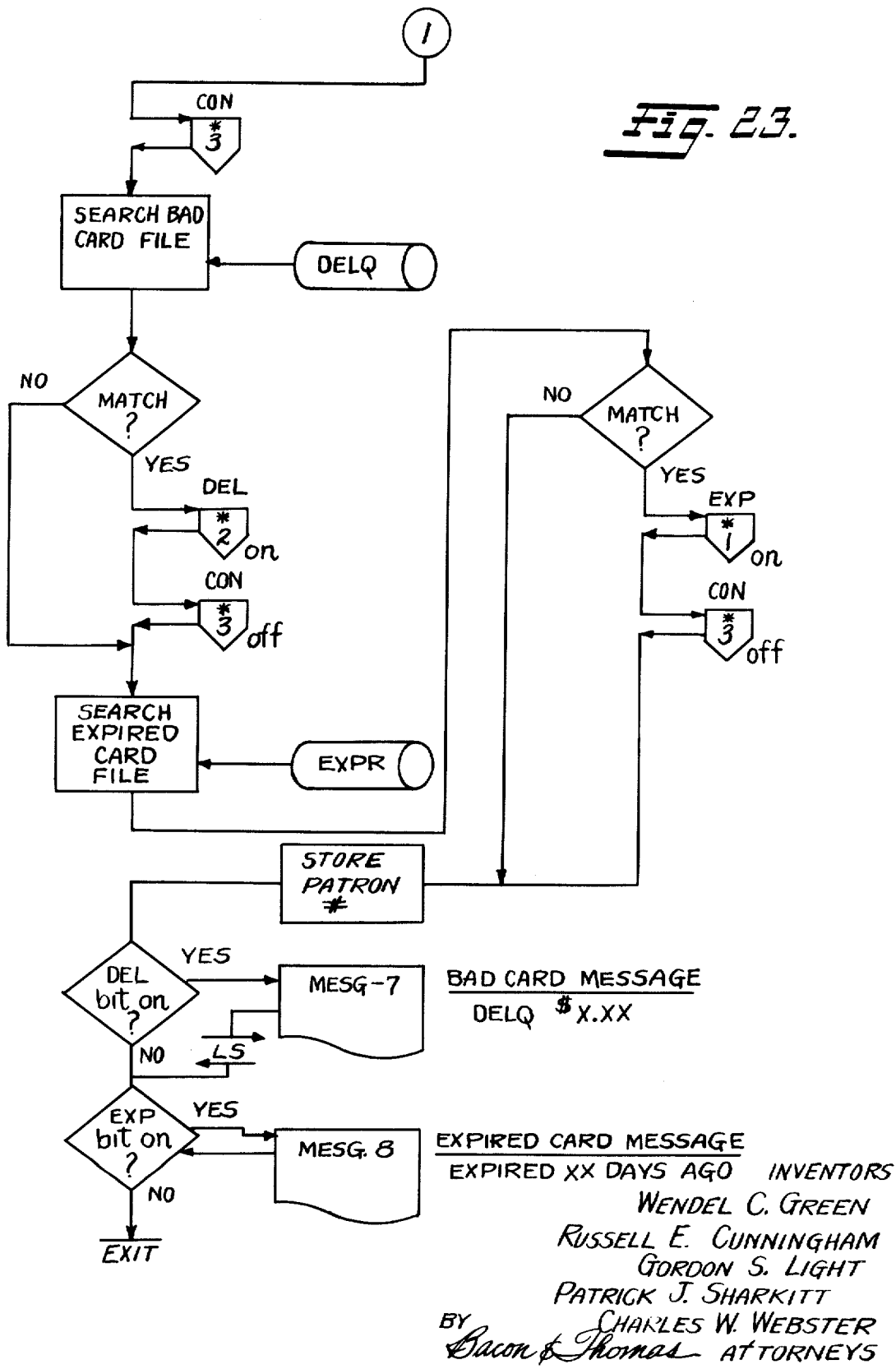
Figure 24:
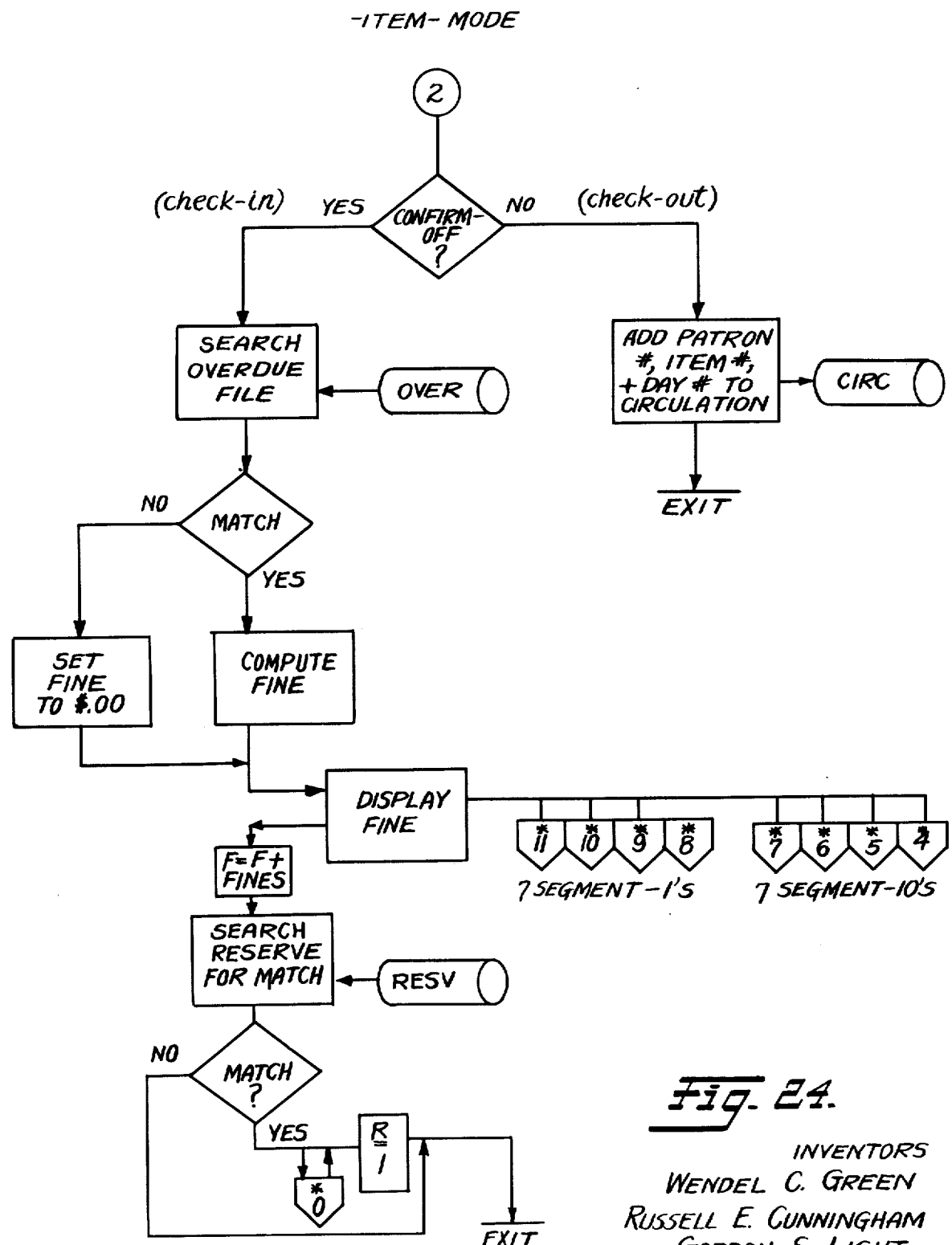
Figure 30:
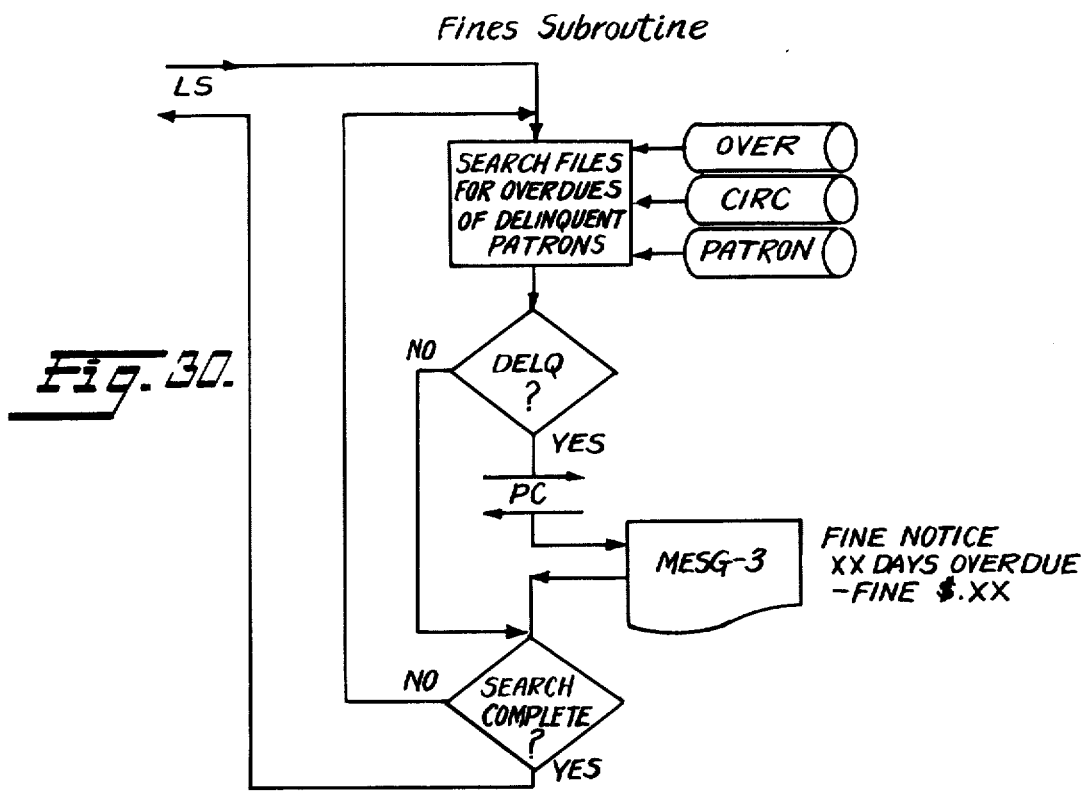
Figure 31:
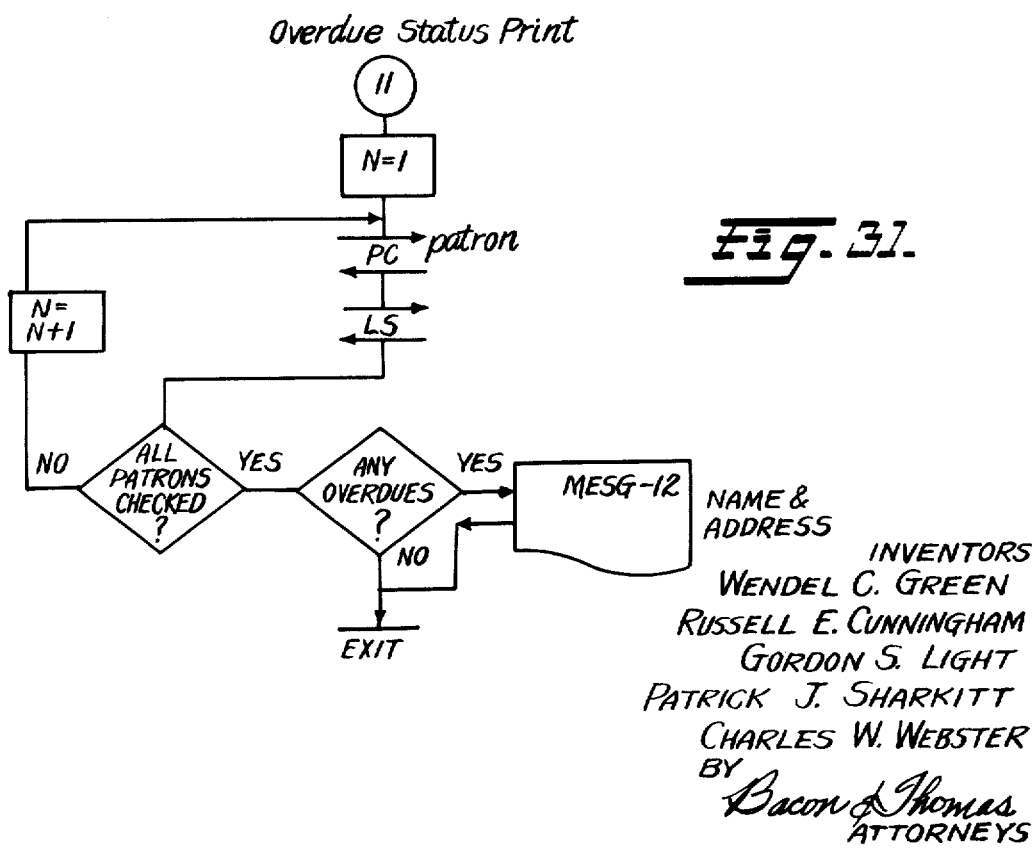

FIG. 23 shows routine (1), the Patron Mode, which is used in checking out an item. The object of this routine is to determine whether the patron card is expired or bad (delinquent). Bit 3 of the output word is set which turns on the CONFIRM light, showing the operator that the patron card is neither expired nor bad. This light is turned on immediately upon entering the routine and is only turned off if a match occurs in the expired or bad (delinquent) card files. A search of the two files takes a few milliseconds and thus a match in these files would result in an undetectable quick flash of the CONFIRM light. If a match does occur in the bad card files, or the expired files, the respective DELINQUENT or EXPIRED bit will be set and the corresponding console light energized. After a search of these two files has been made, the patron number is stored and if a match has occurred, a message is printed on the teletype (Mesg 7 or Mesg 8) to indicate either the dollar fine or the number of days the card has been expired. The LS Subroutine is entered after printing Mesg 7. This subroutine is shown in FIG. 30 and is used to list the overdue books together with the overdue fines.

To complete the Check-Out, it is only necessary to record the transaction in the circulation file. This is done in the Item Mode Routine, shown in FIG. 24. This routine is used both for Check-In or Check-Out. For Check-Out the CONFIRM bit will be set from the previous Patron Mode (1). The CONFIRM bit is set since when checking out a book, the patron card is read first, followed by the item card. For checking in a book the patron does not present his card and thus the CONFIRM bit never gets set. The Check-Out procedure simply entails adding the patron's number (stored in the Patron Mode (1) routine) together with the item number(s) of the book(s) and the data to the circulation file.

The above Check-Out procedure is complete as long as there is no match in the expired and delinquent files and the CONFIRM bit is set. If the patron presents an expired card, a message (Mesg 8) is printed on the Teletype and Mode Select B must be entered to purge the expired card from the file before proceeding. Similarly, if the patron is delinquent message 7 is printed and the librarian may then collect the delinquent fine. Routine (7) is then executed to purge the bad card from the file. Thus, the patron may Check-Out books after he has renewed his card of paid his fines.

When a patron wishes to Check-In a book, Mode Select A routes the computer to Item Mode (2). A search is first made of the overdue files. If a match occurs, the fine is computed from the number of overdue days. If no match occurs, the fine is set to zero. The value of the fine is then displayed. After display, the address F is used to store the value of the fine. The last remaining Check-In feature is the reserve book check. If the incoming book matches up with a reserve book, the zero RESERVE bit in the output word is set to one, and the console reserve light comes on. Before exit, the RESERVE flag is set to one which is later used in the Clear Mode (5).

Figure 25:
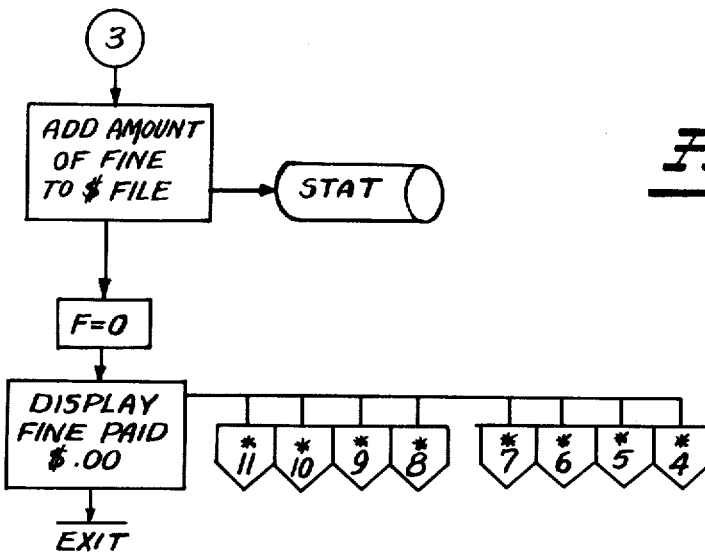
Figure 26:
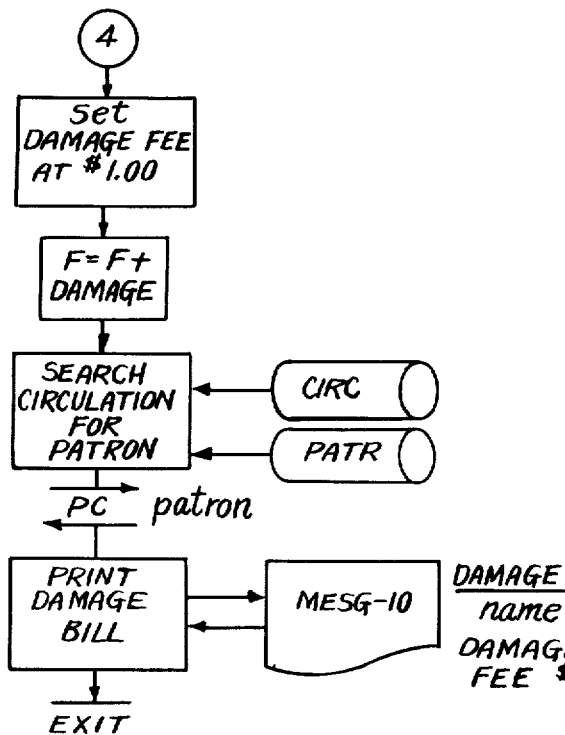

If the patron pays his overdue fine, the operator presses the PAID switch on the console. The Paid Mode (3), shown in FIG. 25, is then used to record the fine on the statistical file. After this step, the fine address, F, is set to zero and a zero fine is displayed to indicate that the paid fine has been recorded.

The Damage Mode (4) is used to increment the fine address F by a preselected value, say $1.00, for any damage to a returned book. If desired, the Damage Mode can be entered two or more times depending on the severity of the damage. After setting the fine, a search is made of the circulation file to find out the patron number associated with the previously read item number. The PC Subroutine is used to print out the message: ITEM (item number). The Teletype is then used to print a properly addressed bill showing the damage book fee (Mesg 10).

Figure 27:
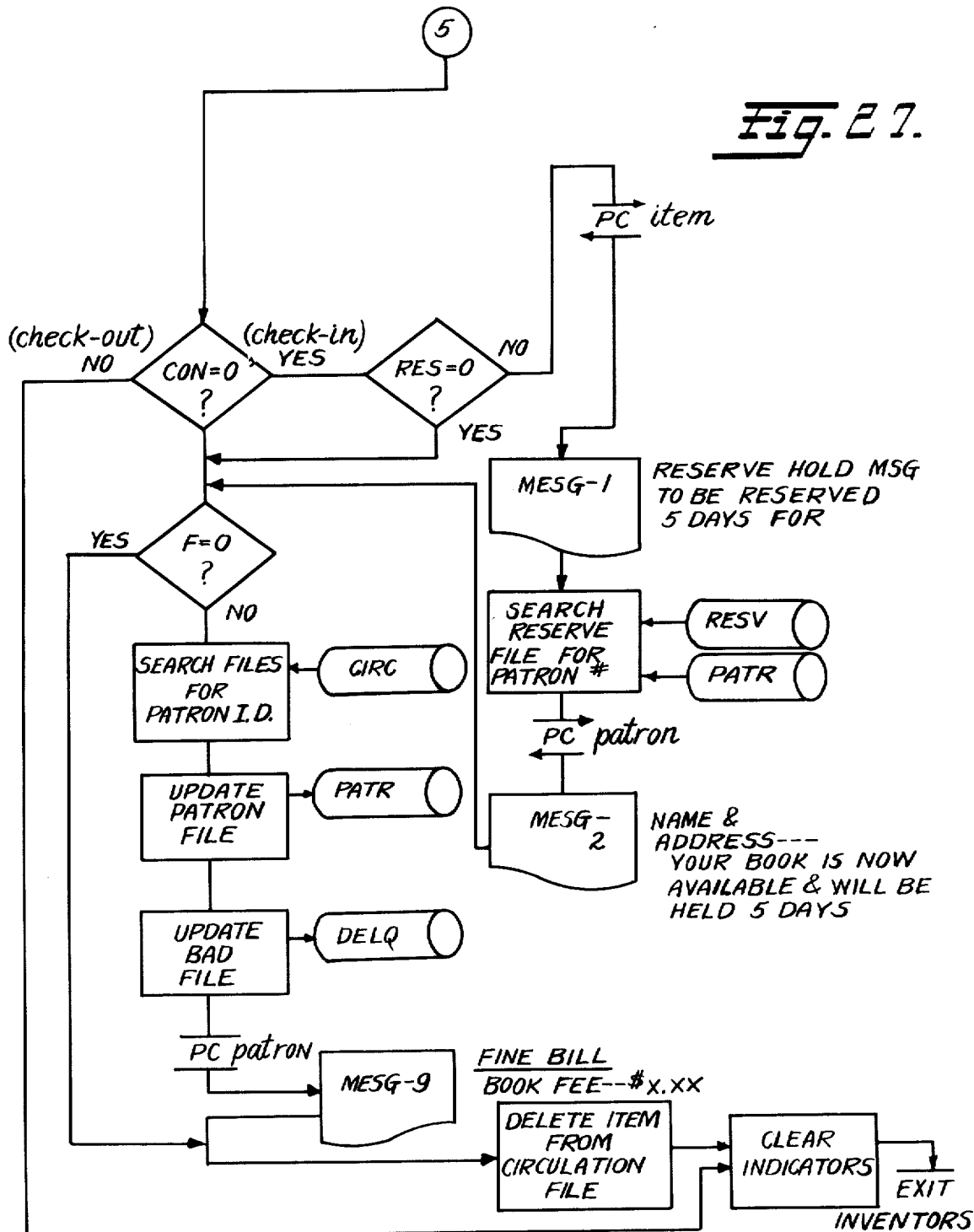

The Clear Mode (5), shown in FIG. 27, is used to separate one transaction from another. To enter the Clear Mode (5), the operator either depressed the CLEAR button 124 on the console, or pulls out the item card, activating switch 202. If the book is a Check-Out, the program resets all the input and output words and goes to exit. If the book is a Check-In, and the RESERVE flag is set (R=1 in Item Mode (2)), a reserve hold message is printed (Mesg 1), searches of the reserve and patron files are conducted, and the patron number is printed via the Subroutine PC. The Teletype then prints a notice to the patron who has reserved the book (Mesg 2).

After the reserve messages are printed, or if the RESERVE flag is not set, a check of the F address is made, to see if there are any fines. F is the total fine resulting from overdue and damage fees. If F=0, there are no fines and the item is deleted from the circulation file. If F is non-zero the circulation, patron, and delinquent files are updated, and the patron number is printed followed by the book fee bill. The book number is then deleted from the circulation file, the indicators are cleared and the program exits.

Figure 28:
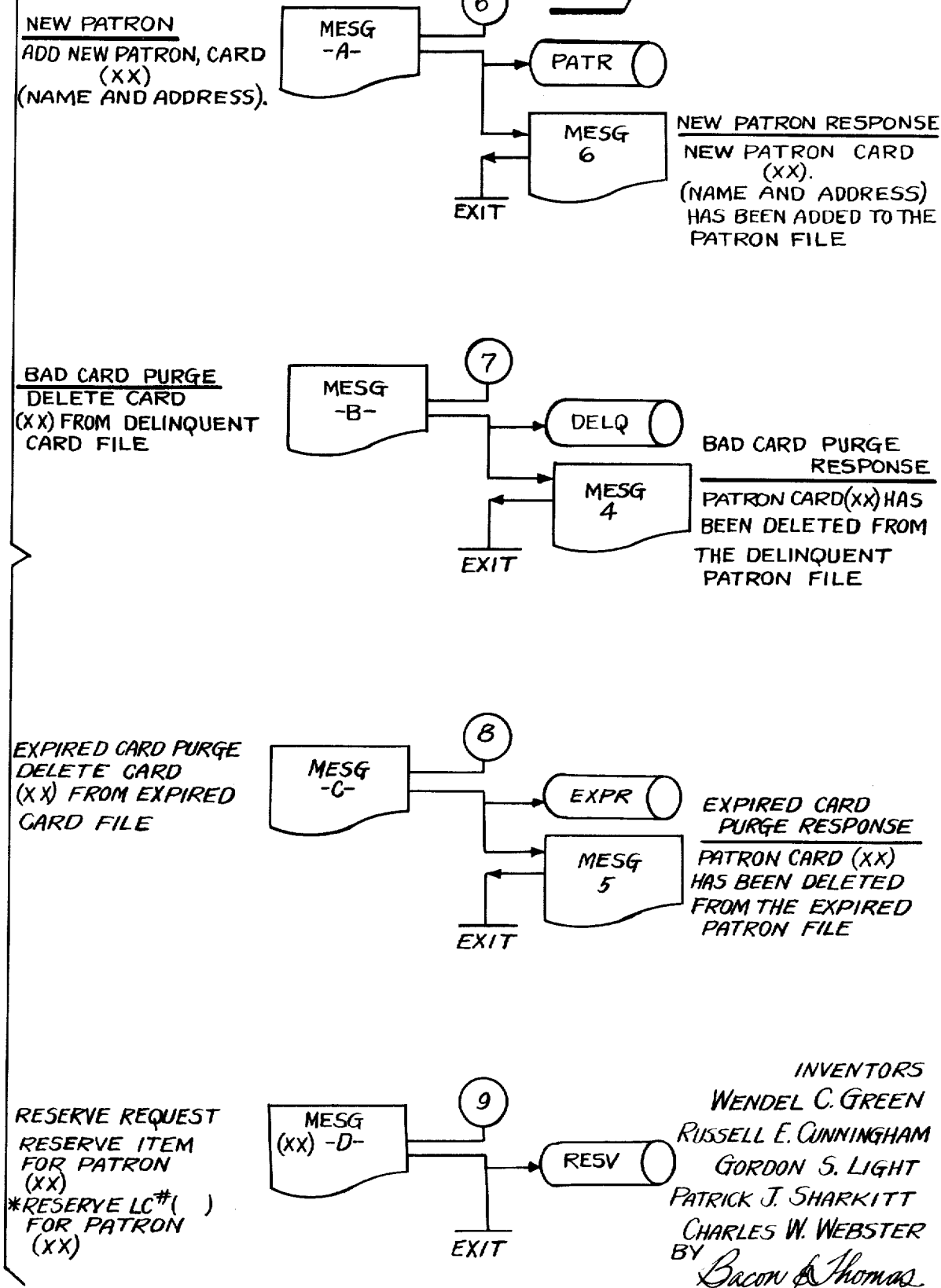

FIG. 28 shows the message input-output format printed after hitting the CLEAR button three times and entering Mode Select B. The left hand side of the figure shows the input format which the operator uses, and the messages in the right hand side of the figure are output messages printed after the appropriate data has been entered or deleted on the file.

Figure 29:
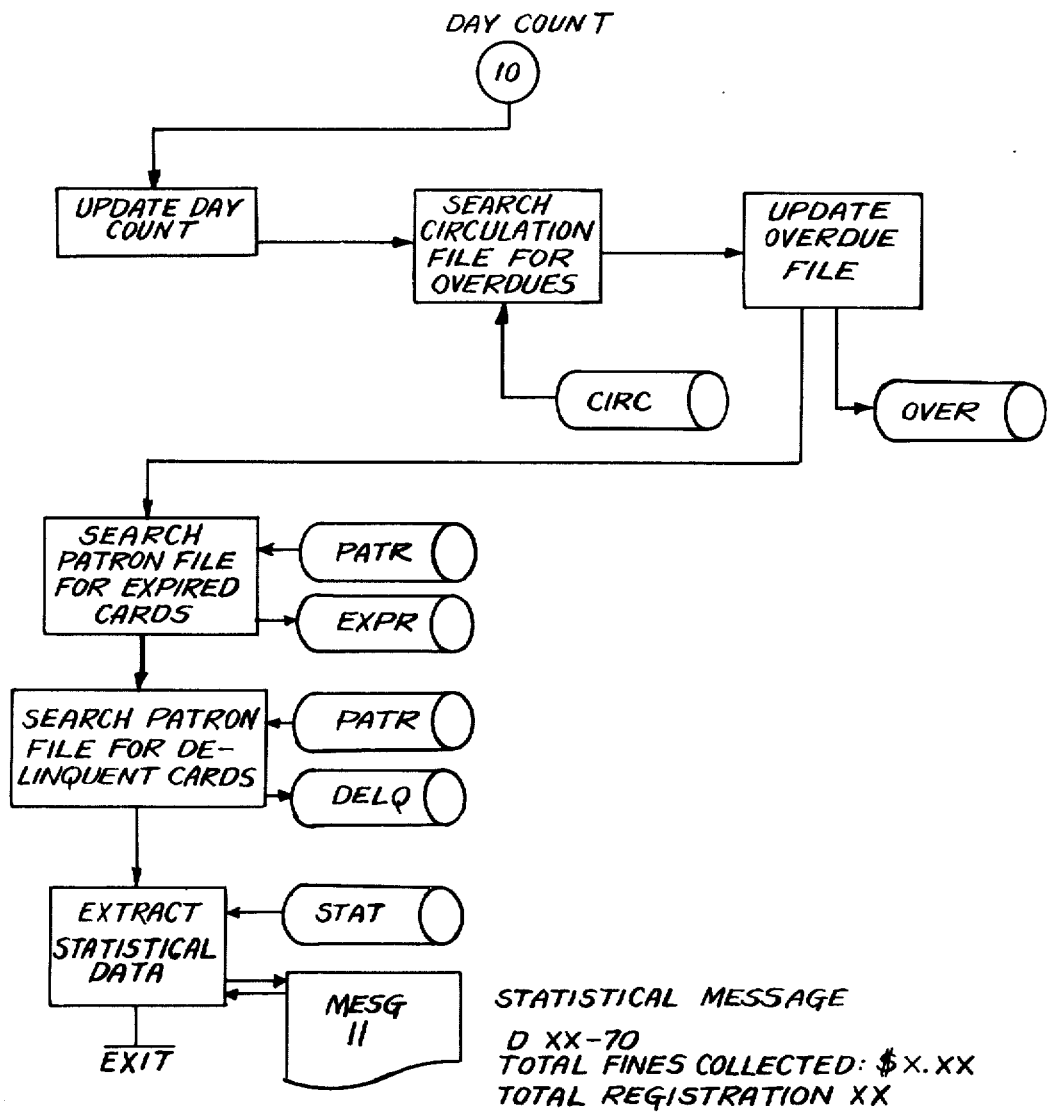

The Day Count Routine (10), shown in FIG. 29, is used to update the overdue, expired and delinquent files. A routine to extract desired statistical data which is printed on the Teletype is also provided. The Day Count Routine in this system is conducted on-line since the circulation file is in core and relatively small. However, in a larger system, such as shown in FIG. 1, the file updating is done at night, during library off-hours.

The LS Subroutine shown in FIG. 30 prints out the number of overdue days and the associated fine for every book corresponding to the stored patron number of interest. The LS Subroutine is used only twice. In the Patron Mode (1), the patron is known to be delinquent so that the item number and message 3 will always be printed. The second use of the LS Subroutine is in the Overdue Status Print (11), shown in FIG. 31. Here N is a variable used to keep track of the number of patrons (N=4 in the ADCIS program). The program prints out all overdue books and the associated patron numbers.

Figure 32:
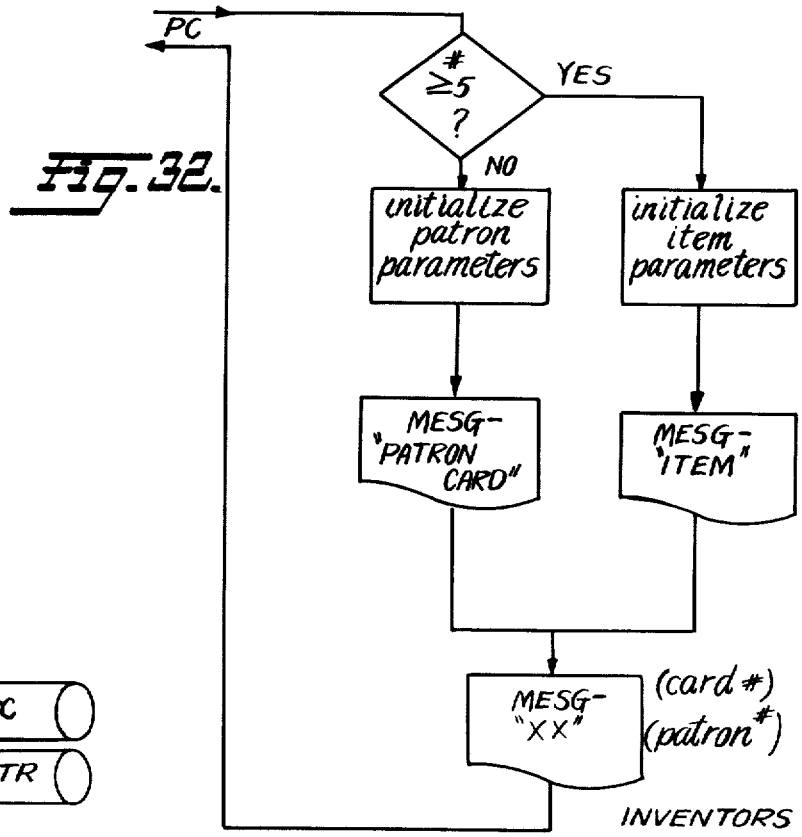

The Patron/Item Subroutine PC is shown in FIG. 32 and has been discussed above. It simply determines if the input data word is a patron or item number, and prints the word "patron", or "item" accordingly followed by the number. There is also a step to initialize all input parameters, e.g., turn off all console lights.

While there has been described and illustrated specific embodiments of the invention, it will be clear that variations in the details of the embodiments specifically illustrated and described may be made without departing from the true spirit and scope of the invention as defined in the appended claims.

APPENDIX A

ADCIS

MODIFICATIONS TO GENERAL AUTOMATION
ASSEMBLER LANGUAGE USED FOR THIS PROGRAM

```
*
*       A=PROCESSING REGISTER
*       B=OPERAND BUFFER AND SUBROUTINE RETURN
*         ADDRESS REGISTER
*       X=INDEXING CONTROL REGISTER
*       Y=ADDRESSING OR INDEX CONTROL REGISTER
*       Z=ADDRESSING OR INDEX CONTROL OR ALTERNATE
*         SUBROUTINE RETURN ADDRESS REGISTER
*
*
        ZE    AZE    A
        ZE    ALD    A,0
        ZE    AAD    A,B
        ZE    AAD    A,0
        ZE    ASU    A,B
        ZE    ASU    A,0
```

```
ZE    AND    A,0
ZE    AXR    A,0
ZE    AOR    A,0
ZE    AZE    X
ZE    ALD    X,0
ZE    AAD    X,0
ZE    ASU    X,0
ZE    ALD    B,0        WRC BYTE
ZE    AAD    P,B        WRC BYTE
ZE    ALD    Y,0        WRC BYTE

ZE    RTR    A,B
ZE    RTR    B,A
ZE    RTR    X,B
ZE    RTR    B,X
ZE    RTR    Y,B
ZE    RTR    B,Y
ZE    RTR    Z,B
ZE    RTR    B,Z
ZE    RIC    P,B
ZE    RIC    B,P
ZE    RDC    B,B
ZE    RIC    Y,Y
ZE    RDC    Y,Y
ZE    RIC    Z,P        WRC BYTE
ZE    RIC    P,Z        WRC BYTE
ZE    RIC    X,X        WRC BYTE

ZE    INE
ZE    TBB
ZE    TBE
ZE    FOB
ZE    DOB
ZE    DIB
ZE    SHR    A
ZE    SHC    A
ZE    SHL    A
ZE    PLR
ZE    PLS

ZE    GOL    A,X
ZE    GOS    A,X
ZE    GOL    A,Y
ZE    GOS    A,Y
ZE    GOL    A,Z
ZE    GOS    A,Z
ZE    GOL    A,X,I
ZE    GOS    A,X,I

*
*  THE FOLLOWING SHARED COMMAND BYTES ASSUME
*  X IS INDEXING CONTROL SELECTED IN THE
*  INDIRECT ADDRESS WORD

ZE    GOL    A,Y,I
ZE    GOS    A,Y,I
ZE    GOL    A,Z,I
ZE    GOS    A,Z,I

*
*
ZY
*
```

LISTINGS

```
*
*           LINKAGE
        JMP     0
        JMP     6400
        SKP     0
        RTR     B,Y
        RDC     Y,P
        JMP     2000
        JMP     5
        JMP     14
        JMP     16

*       SYSTEM CONSTANTS ----------
*
I       ZC      5
P       ZC      1
FN      ZA      0
ST      ZA      0
DT      ZC      0
RI      ZA      0
RO      ZA      0
AD      ZC      0
        ZC      10
IT      ZC      0
PP      ZC      0
II      ZC      0
HP      ZC      0
RG      ZC      0
H1      ZA      *
H2      ZA      *

*                               MATH ROUTINES
        JMP     SM
        JMP     SD
        JMP     ED
        JMP     DP
*
        ZC      0
        ZC      0               THOUSANDS
        ZC      0               HUNDREDS
        ZC      0               TENS
        ZC      0               UNITS
        ZC      256             .
        ZC      0               TENTHS
        ZC      0               SIGN
        JMP     M1
        JMP     *               BID & PRINT 6 BYTES
        JMP     M3              BID & PRINT INTEGERS
        JMP     M4              PRINT INTEGERS
*                       BID AND PRINT 6 BYTE FRACTION
*
M1      RIC     P,B
        JMP     BD
        ALD     A,10
        AZE     X
        JMP     DP
*
*                       BID AND PRINT 5 BYTE INTEGER
*
M3      RIC     P,B
        JMP     BD
        ALD     A,5
        AZE     X
        JMP     DP
*
*                       PRINT 5 BYTE INTEGER
*
M4      ALD     A,5
        AZE     X
        JMP     DP
```

```
*
*
*                        PRINT ROUTINE
DP      RTR     A,B
        STB     XX+1
CY      LDB     1110,X      A REG = # OF CHARS
        RTR     B,A
        RIC     P,B
        JMP     120
        RIC     X,X
        RTR     X,A
XX      ASU     A,0
        SKP     2
        JMP     CY
        RIC     Z,P
*                           BID
SM      STB     M1
        TBB
        STB     M1+1
        RTR     A,B
        AAD     A,B
        RTR     A,X
        RTR     A,B
        AAD     A,B
        RTR     A,B
        AAD     A,B
        RTR     A,B
        RTR     X,B
        ELB     MA
        RIC     D,P
*
MA      ZA      *
*
SD      STB     D1
        TBB
        STB     D1+1
        RTR     A,Z
        RTR     A,B
        TBB
        RTR     B,Y
        SHL     Y
        RTR     Y,B
        STB     DV+1
        AND     A,370
DV      AOR     A,0
        SHL     A
        SHL     A
        SHL     A
        RTR     A,Y
        SHR     A
        SHR     A
        RTR     A,B
        ASU     Y,B
        SHR     A
        SHR     A
        RTR     A,B
        AAD     Y,B
        SHR     A
        SHR     A
        RTR     A,B
        ASU     Y,B
        SHR     A
        SHR     A
        RTR     A,B
        AAD     Y,B
        RTR     Y,A
        RIC     P,B
        JMP     SM
        RTR     A,B
        ASU     Z,B
        SKP     6
        RDC     Y,Y
        SKM     0
        AAD     Z,12
```

```
         RTR    Z,A
         ASU    A,12

SKN    4
         RIC    Y,Y
         RTR    A,Z
         RTR    Y,A
         ELB    D1
         RIC    D,P
*
D1       ZA     *
BD       STB    SV
         TBB
         STB    SV+1
         RTR    Z,B
         STB    SW
         TBB
         STB    SW+1
         ALD    B,240
         STD    1110
         STB    1111
         STB    1112
         STB    1113
         STB    1117
         ALD    B,260
         STB    1114
         RTR    A,X
         RTR    A,D
         TBB
         RTR    B,A
         AND    A,10
         SKN    4
         RTR    X,A
         JMP    PL
         ALD    B,255
         STB    1117
         RTR    X,B
         AZE    A
         ASU    A,B
PL       RIC    P,B
         JMP    SD
         AAD    Z,260
         ALD    X,2
         RTR    Z,B
         STB    1116
B1       RTR    A,A
         SKN    2
         JMP    EX
         RTR    X,B
         STB    SV+2
         RIC    P,B
         JMP    SD
         LDB    SV+2
         RTR    B,X
         AAD    Z,260
         RTR    Z,B
         STB    1112,X
         RDC    X,X
         JMP    B1
EX       ELB    SV
         RTR    D,Z
         ELB    SV
         RIC    B,P
SV       ZA     *
         ZC     0
SU       ZA     *
         ZD
```

```
                           SCHEDULER
M       RIC    P,B
        JMP    216
        AOR    A,200
        RTR    A,X
        ASU    A,272
* BUS
        SKN    2
        JMP    1612
        RTR    X,A
        ASU    A,316        N
        SKN    2
        JMP    M
        RTR    X,A
        ASU    A,302        B
        SKN    2
        JMP    M
        RTR    X,A
        ASU    A,305        E
        SKN    2
        JMP    M
        RTR    X,A
        ASU    A,322        R
        SKN    2
        JMP    M
        RTR    X,A
        ASU    A,304        D
        SKN    2
        JMP    M
        RTR    X,A
        ASU    A,317        O
        SKN    2
        JMP    2700
        RIC    P,Z
        JMP    7547
        JMP    M

*                          INITIALIZE
        ALD    B,143
        STB    6505
        ALD    B,100
        STB    6506
        JMP    6500
*
        ALD    B,50
        STB    6505
        ALD    B,157
        STB    6506
        JMP    6500

*                          READ SUBROUTINE
*
*              RIC    P,Z
*              JMP    UI
*              ZA    -AD-   STARTING ADDRESS
        RTR    Z,X
*
        LDB    2,X
        STB    H1
        LDB    3,X
        STB    H1+1
        ELB    H1
        RTR    B,X
        TBB
*
        SKZ    2
        JMP    PA
        ELB    AD
        RTR    B,X
*
PA      RIC    P,B
        JMP    216
        RTR    A,B
```

```
            STB     O,X
            RIC     X,X
            ALD     B,377
            AXR     A,D
            SKZ     2
            JMP     PA
*
            AAD     Z,2
            RIC     Z,P
*
AD          ZL      1065
H1          ZL      1074

*
*                       PRINT SUBROUTINE
*
*
*                   RIC     P,Z
*                   JMP     UO
*                   ZA      AD        STARTING ADDRESS
*
*
            RTR     Z,X
            LDB     2,X
                    STD     H1
            LDB     O,X
            STD     H1+1
            ELB     H1
            RTR     B,X
            TBB
*  WORDS 1&2 PRINT ADDRESS;  LOAD ADDRESS & XFER TO X
            SKZ     2
            JMP     PA
            ELB     AD
            RTR     B,X
*  TEST FOR INDIRECT ADDRESS AND USE ADDRESS    -AD-
PA          ALD     A,377
            LDB     O,X
            AXR     A,B
*  TEST FOR END OF MESSAGE
*
            SKN     2
            JMP     PB
            RTR     B,A
            RIC     P,D
            JMP     120
            RIC     X,X
            JMP     PA        CYCLE
*
PB          AAD     Z,2
            RIC     Z,P
AD          ZL      1065
H1          ZL      1074
*
*
*       MODE SELECT --------------
*
* PROCESS INTERRUPT
            ALD     B,277
            FOB
            ALD     B,1
            DIB
* CTR BIT ON?
            SKN     2
            JMP     AD
* YES
            ALD     B,376
            STD     CT
            ALD     B,277
            FOB
            ELB     CN
* READ CARD
```

```
                DIB
                TDB
* CARD =0?
                SKN     2
* YES- ERROR EXIT -6-
                JMP     EX
                JMP     1612
*
* NO
AA              RTR     B,A
                RIC     P,B
                JMP     PC
* #GR THAN 5?
                ASU     A,5
                SKM     2
                JMP     XX
* PATRON
                JMP     XX
* NO EXIT -1-
* YES EXIT -2-
*
*
* YES

AB              ALD     B,277
                FOB
                ALD     B,2
                DIB
* CLA BIT ON?
                SKZ     2
                JMP     AC
*
                ALD     B,361
                ALD     B,376
                STB     CT
* NO
                ALD     B,277
                FOB
                ALD     B,4
                DIB
* PAY BIT ON?
                SKZ     2
* PAY EXIT -3-
                JMP     XX
* NO
                ALD     B,277
                FOB
                ALD     B,10
                DIB
* DAM BIT ON?
                SKZ     2
* DAM EXIT -4-
                JMP     XX
* NO ERROR EXIT -7-
                JMP     EX
*CLA
AC              LDB     CT

* 3 IN A B OU?
                SKP     2
                JMP     EX
                ALD     B,376
                STB     CT
                JMP     1600
* NO EXIT -5-
BK              RIC     B,B
                STB     CT
                JMP     XX
XX              JMP     EX
*
CN              ZC      0
                ZC      17
CT              ZC      0
*
```

```
*
*       PATRON MODE ------------------
*
*  ACK ON
         RIC    P,Z
         JMP    DO
         ZC     10
*  SEARCH BAD FILE (DELQ)
         LDB    PP
         RTR    B,X
         LDB    3701,X

*  MATCH?
         SKN    2
         JMP    BA
*  YES
*  DEL ON: ACK OFF
         RIC    P,Z
         JMP    DO
         ZC     4
         RIC    P,Z
         JMP    DO
         ZC     367
*  NO
BA       LDB    PP
         RTR    B,X
*  SEARCH EXPIRED CARD FILE (EXPR)
         ;FN t
         LDB    3602,X
         SKP    2
         JMP    DB
*YES
         RTR    B,A
         RIC    P,B
         JMP    1104
         LDB    1114
         STB    5711
         LDB    1116
         STB    5712
*  EXP ON* ACK OFF
         RIC    P,Z
         JMP    DO
         ZC     2
         RIC    P,Z
         JMP    DO
         ZC     367
*  NO
*
BB       LDB    RO
         RTR    B,A
         AND    A,4
         SKN    2
         JMP    BC
*
*  BAD CARD MESSAGE -7-
         RIC    P,B
         JMP    LS
*  NO
BC       LDB    RO
         RTR    B,A
         AND    A,2
*  EXP BIT ON?
         SKN    2
         JMP    BD
*  YES EXPIRED CARD MESSAGE -8-
         RIC    P,Z
         JMP    UO
         ZA     5700
*  NO
BD       JMP    EI
LS       ZL     5500
```

```
*
*     ITEM MODE --------
*
       LDB    II
       RTR    B,X
       LDB    R0
       RTR    B,A
       AND    A,10
* ACK OFF?
       SKZ    2
       JMP    P0
* YES (CHECK IN)
* SEARCH OVERDUE FILE (OVER)
       LDB    3702,X
* MATCH?
       SKM    2
       JMP    PA
* YES
       AZE    A
       JMP    PB
* NO COMPUTER FINE
PA     RTR    B,A
       AAD    A,B
       LDB    3702,X
       AAD    A,B
PB     RTR    A,Z
* F= F+FINE
       LLB    FN
       AAD    Z,B
       RTR    Z,B
       STB    FN
       TBB
       STB    FN+1
* DISPLAY FINE
       RIC    P,B
       JMP    DV
       RTR    Z,B
       STB    R0+1
       SHC    A
       SHC    A
       SHC    A
       SHC    A
       LDB    R0
       AOR    A,B
       RTR    A,B
       STB    R0
       RIC    P,Z
       JMP    D0
       ZC     0
* SEARCH RESERVE FOR MATCH (RESV)
       LDB    II
       RTR    B,X
       ALD    B,200
       STB    3702,X
       LDB    3602,X
       SKM    2
       JMP    XX
* YES RES LIGHT ON
       RIC    P,Z
       JMP    D0
       ZC     1
       JMP    XX

* ADD PATRON #, ITEM #, AND DATE# TO CIRCULATION (CIRC)-
P0     LDB    P
       STB    3700,X
       ALD    D,370
       STB    3702,X
       ALD    B,177
       STB    3703,X
* INCREMENT COUNTER IN ITEM RECORD
XX     JMP    EX
```

```
*
*
*        PAID MODE --------------
*
* ADD AMOUNT OF FINE TO S FILE (STAT)
         RIC      P,Z
         JMP      WO
         ZA       5473
         ELB      ST
         RTR      B,X
         ELB      FN
         AAD      X,B
         RTR      X,B
         STB      ST
* F=0
         TBB

STB      ST+1
         TBB
         STB      FN
         STB      FN+1
* DISPLAY FINE PAID $.00
         ELB      RO
         RTR      B,X
         AND      X,17
         RTR      X,B
         STB      RO
         TBB
         STB      DO+1
         RIC      P,Z
         JMP      DO
         ZC       0
         JMP      EX

*        DAMAGE MODE -----------
*
* F=F+DAMAGE
*
         LDB      II
         RTR      B,X
         LDB      3700,X
         RTR      B,A
         RIC      P,D
         JMP      PC
         ELB      FN
         RTR      B,X
         LDB      D1
         AAD      X,B
         RTR      X,B
         STB      FN
         TBB
         STB      FN+1
*
* D=ON
*
* PRINT DAMAGE BILL
*NAME AND ADDRESS
         RIC      P,Z
         JMP      WO
FL       ZA       0
* ITEM X:  DAMAGED BOOK FEE $1.00    -MX-
         RIC      P,Z
         JMP      WO
         ZA       6010
         JMP      EX
*
D1       ZC       144
*
*        CLEAR MODE ------------
         RIC      P,Z
         JMP      WO
         ZA       5070
```

```
*
        LDB     RO
        RTR     B,Y
        RTR     B,A
        AND     A,10
* ACK OFF?
        SKZ     2
        JMP     PO
* YES
        AND     Y,1
        SKN     2
        JMP     PA
* NO
* RESERVE HOLD MESSAGE -1-
        LDB     I
        RTR     B,A
        RIC     P,B
        JMP     PC
        RIC     P,Z
        JMP     WO
        ZA      5000
        LDB     II
        RTR     B,X
        LDB     3600,X
        RTR     B,A
        RIC     P,B
        JMP     PC

*   NAME AND ADDDRESS
        RIC     P,Z
        JMP     WO
FL      ZA      0
* RESERVE NOTICE MESG -2-
        RIC     P,Z
        JMP     UQ
        ZA      5101
* FINE =0?
PA      LDB     FN
        SKN     2
        JMP     PD
* NO
* SEARCH FILES FOR PATRON I.D.
        LDB     II
        RTR     B,X
        LDB     3700,X
        RTR     B,A
        RIC     P,B
        JMP     PC
        LDB     3700,X
        STB     TP
        LDB     3701,X
        STB     TP+1
* UPDATE PATRON FILE
        ELB     FN
        RTR     B,A
        ELB     TP
        AAD     A,B
        RTR     A,B
        STB     3700,X
        TBB
        STB     3701,X
*
        ELB     FN
        RTR     B,A
        RIC     P,B
        JMP     1104
        LDB     1113
        STB     5056
        LDB     1114
        STB     5060
        LDB     1116
        STB     5061
```

```
* FINE BILL MESG -9-
        RIC     P,Z
        JMP     UO
        ZA      5040
PD      LDB     II
        RTR     B,X
        TBB
        STB     3703,X
*
PO      TBB
        STB     RO
        STB     RO+1
        STB     I
        STB     P
        STB     FN
        RIC     P,Z
        JMP     DO
        ZC      0
        JMP     EX
TP      ZA      *
```

```
*
*
*       NEW PATRON ---------
*
        RIC     P,Z
        JMP     UO
        ZA      6200
        RIC     P,B
        JMP     216
        AOR     A,200
        RIC     P,B
        JMP     PC
        ALD     B,350
        STB     3602,X
        LDB     HP
        RTR     B,X
* DATE
        TBB
        STB     3700,X
        STB     3701,X
*
        RIC     P,Z
        JMP     7547
        RIC     P,Z
        JMP     UI
*
        ZA      0
*
        LDB     P
        RTR     B,A
        RIC     P,B
        JMP     PC
        RIC     P,Z
        JMP     UO
        ZA      0
        RIC     P,Z
        JMP     UO
        ZA      5530
* INCREASE REGISTRATION
        LDB     RG
        RIC     B,B
        STD     RG
        JMP     EX
*
```

```
                BAD CARD PURGE
        'DELETE CARD'   -B1-

RIC     P,Z
        JMP     UO
        ZA      6051
        RIC     P,B
        JMP     216

AND     A,17
        RIC     P,D
        JMP     PC
        TBB
        TBB
        STB     3700,X
        STB     3701,X

*       'CARD XX HAS BEEN DELETED FROM THE DELINQUENT
*       PATRON FILE'   -4-

RIC     P,Z
        JMP     UO
        ZA      5311
        JMP     EX              EXPIRED CARD PURGE

'DELETE CARD'   -B1-
        RIC     P,Z
        JMP     UO
        ZA      6051
        RIC     P,B
        JMP     216
        AND     A,17
        RIC     P,B
        JMP     PC

*       'FROM EXPIRED CARD FILE'  -B2-
        ALD     D,350
        STB     3302,X
        RIC     P,Z
        JMP     UO
        ZA      5411
        JMP     EX

* RESERVE REQUEST ----------
*
* RESERVE REQUEST -D- (RESV)
        RIC     P,Z
        JMP     UO
        ZA      6334
        RIC     P,B
        JMP     216
        AOR     A,200
        AAD     A,200
        SKP     2
        JMP     LC
        AND     A,17
        RIC     P,B
        JMP     ML
        AAD     A,200
        RTR     A,Z
        RIC     P,B
        JMP     216
        AND     A,17
        RTR     Z,B
        AAD     A,B
        RIC     P,D
        JMP     PC
        RIC     P,Z
        JMP     UO
        ZA      6355
```

```
            RIC     P,B
            JMP     216
            LDB     II
            RTR     B,X
            AND     A,17
            RTR     A,B
            STB     3600,X
            ALD     B,372
            STB     3602,X
            JMP     EX
LC          ALD     A,303
            RIC     P,B
            JMP     120
            ALD     A,243
            RIC     P,B
            JMP     120
            ALD     X,7
CY          RIC     P,B
            JMP     216
            ADC     X,X
            SKZ     2
            JMP     CY
            JMP     EX
*
*   FINES -- SUBROUTINE
*
LS          STB     HD
            TBB
            STB     HD+1
*
CY          LDB     P
            RTR     B,A
            LDB     CN
            RTR     B,X
*
            LDB     3700,X
            ASU     A,B
            SKZ     2
            JMP     BY
* MATCH
            LDB     3702,X
            SKP     2
            JMP     EY
*   OVERDUE
            STB     FN
            LDB     3701,X
            RTR     B,A
            RIC     P,B
            JMP     PC
*
            LDB     FN
            RTR     B,A
            RIC     P,Z
            JMP     1120
*
            RIC     P,Z
            JMP     UO
            ZA      UN
            LDB     FN
            RTR     B,A
            AAD     A,B
            LDB     FN
            AAD     A,B
            RIC     P,Z
            JMP     1120
*
BY          LDB     CN
            RTR     B,X
            ASU     X,74
            SKN     2
            JMP     EN
*  NOT DONE
            AAD     X,100
            RTR     X,B
```

```
            STB    CN
            JMP    CY
*
DN          AAD    B,20
            STB    CN
            TBB
            STB    FN
            STB    FN+1
            ELB    HD
            RIC    B,P
*
HD          ZA     *
CN          ZC     20

UN          ZL     5700

*   PATRON/ITEM SUBROUTINE
*     RIC   P,B
*     JMP   PC
*     A=P OR I:  IF NEG., SUPPRESS PRING
*     EXIT: AREG= I OR P   X=PP
*
PC          STB    HD
            TBB
            STB    HD+1
            RTR    A,B
            STB    HC
            RDC    A,A
            AND    A,17
            RTR    A,Z
*   # GR. THAN 5?
            ASU    Z,4
            SKM    2
            JMP    TM
*   PATRON
            RIC    A,B
            STB    P
            SHC    A
            SHC    A
            RTR    A,B
            STB    HP
            RTR    B,Y
            RTR    A,X
            AAD    X,5
            RTR    X,B
            STB    AD
            SHC    A
            SHC    A
            SHC    A
            SHC    A
            RTR    A,B
            STB    PP

LDB    HC
            SKP    2
            JMP    DN
            RIC    P,Z
            JMP    WO
            ZA     5500
            LDB    PP
            RTR    B,X
            LDB    P
            JMP    XX
*
*   ITEM--
TM          RIC    A,B
            STB    I
            SHC    A
            SHC    A
            SHC    A
            SHC    A
            RTR    A,B
```

```
         STB    IT
         SHC    A
         SHC    A
         RTR    A,B
         STB    II
         RTR    D,X

*
         LDB    HC
         CMP    2
         JMP    DN
         RIC    P,Z
         JMP    WO
         ZA     6000
         LDD    I
*
XX       RTR    B,A
         RIC    P,Z
         JMP    1120
*
DN       LDB    HC
         RTR    B,A
         ELB    HD
         RIC    B,P
*
HD       ZA     *
HC       ZC     0

*   STATUS PRINT
*
*   OVERDUES
*
CY       RIC    P,Z
         JMP    7547
         LDB    CN
         STB    P
         RTR    B,A
         RIC    P,B

JMP    PC
         ALD    Y,1
         RIC    P,B
         JMP    LS
         RTR    Y,B
         SKZ    2
         JMP    BY
         RIC    P,Z
         JMP    WO
ZA       
         ZA     0
*
BY       LDB    CN
         RTR    D,A
         ASU    A,4
         SKJ    2
         JMP    DN
*   NOT DONE
         AAD    A,5
         RTR    A,B
         STB    CN
         JMP    CY
*
DN       ALD    B,1
         STB    CN
         JMP    EX
CN       ZC     1
*
```

```
*
*       DAY COUNT MODE -----------
* UPDATE DAY COUNT -----------
        AZE     X
CY.     LDB     3702,X
        RIC     B,D
        STB     3702,X
        LDB     3602,X
        RIC     D,B
        STB     3602,X
        ASU     X,74
        SKM     2
        JMP     DN
        AAD     X,100
        JMP     CY
*
DN      ELB     ST
        RTR     D,A
        RIC     P,B
        JMP     1104
        LDB     1112
        STB     6131
        LDB     1113
        STB     6132
        LDB     1114
        STB     6134
        LDB     1116
        STB     6135
*
*STATISTICS MESSAGE -11-
        LDB     DT
        RIC     P,D
        STB     DT
        RIC     P,Z
        JMP     1120
        RIC     P,Z
        JMP     UO
        ZA      C073
*
        LDB     RG
        RTR     D,A
        RIC     P,Z
        JMP     1120
        JMP     EX
*       DELQ. CARD SUBPROGRAM
*
*
*
        ELB     TP
        RTR     D,A
        RIC     P,B
        JMP     1104
        LDB     1112
        STB     5401
        LDB     1113

STB     5402
        LDB     1114
        STB     5404
        LDB     1116
        STB     5405
        RIC     P,Z
        JMP     UO
        ZA      5370
        RIC     P,B
        JMP     LS
        JMP     2227
* IDLE LOOP
        RIC     P,Z
        JMP     DO
        ZC      0
        INE
        JMP     *-1
```

```
*            DIGITAL OUTPUT SUBROUTINE
*    BIT EXTRACT/MERGE SUBR.
*          RIC P,Z
*          JMP DO
*          ZC   -C-
*
DO        RTR   Z,X
          LDB   P,X
          RTR   B,A
          SKP   2
          JMP   DA
          LDB   RO
          AOR   A,B
          JMP   EX
*
DA        LDB   RO
          AND   A,B
*
EX        ALD   B,277
          FOB
          DIB
          ALD   B,177
          FOB
          LTR   A,B
          STB   RO
          ELB   RO
          DOB
          RIC   Z,Z
          RIC   Z,P
*
RO        ZL    1063
          ZD
```

LABELS

| | | |
|---|---|---|
| P  | ZL | 1053 |
| I  | ZL | 1052 |
| RG | ZL | 1073 |
| FN | ZL | 1054 |
| ST | ZL | 1056 |
| HI | ZL | 1061 |
| RO | ZL | 1063 |
| AD | ZL | 1065 |
| DT | ZL | 1061 |
| IT | ZL | 1067 |
| PP | ZL | 1070 |
| II | ZL | 1071 |
| HP | ZL | 1072 |
| VI | ZL | 1624 |
| VO | ZL | 1672 |
| DO | ZL | 6010 |
| LS | ZL | 3040 |
| PC | ZL | 3420 |
| ML | ZL | 1100 |
| DV | ZL | 1102 |
| EX | ZL | 2    |

We claim:

1. A data processing system for use in a library in controlling the circulation of items and checking the status of users and items, said system having computer means coupled to data storage means, said data storage means having circulation storage locations and status storage locations, said system comprising:

a unique circulation storage location for each said item of said library, at least one circulation station within said library having reading means for reading machine readable label means, means for coupling said computer means to said circulation station, machine readable label means secured to each item for identifying said item, machine readable means for identifying said user, means for storing in status storage locations of said data storage means:

data signals corresponding to a delinquent status of a user label means, and data signals corresponding to an overdue status of an item label means, said reading means, upon reading a user identifying label means, generating electrical user identifying data signals, said reading means, upon reading an item identifying label means, generating electrical item identifying data signals, means for directly accessing a user status storage location in said data storage means said user status storage location having an address directly determined by said user identifying data signals, means for generating on-line a user status signal responsive to data in said directly accessed user status storage location, said user status signal corresponding to a delinquent status of said user label means, means responsive to said user status signal for storing on-line at a specified address of said circulation storage locations of said data storage means representations of said user identifying data signals from said recording means, said circulation storage locations address directly specified from said item identifying data signals and being in one-to-one correspondence therewith, whereby each specified address corresponds to a unique one of said items of said library, means for directly accessing an item status storage location in said data storage means, said item status storage location having an address directly determined by said item identifying data signals from said reading means, means for generating on-line an item status signal responsive to data in said directly accessed item status storage location, said item status signal corresponding to an overdue status of said item, means responsive to said item status signal for directly accessing specified address of said circulation storage locations of said data storage means, said specified circulation storage locations address directly determined by said item identifying data signals from said reading means, and means for deleting from said specified address of said circulation storage locations said corresponding representations of said user identifying data signals, whereby an on-line circulation file is maintained for associating library users and items and for providing on-line delinquent and overdue status checks.

2. A data processing system as recited in claim 1 further comprising:

means for directly accessing an additional users status storage location in said data storage means, said additional user status storage location having an address directly determined by said user identifying data signals from said reading means, and means for generating an additional users status signal responsive to data in said additional directly accessed users status storage location.

3. A data processing system as recited in claim 2 further comprising:

user delinquent indication means, means for energizing said user delinquent indication means from said user status signal, user expired label indication means, and means for energizing said user expired label indication means from said additional user status signal.

4. A data processing system as recited in claim 2 further comprising item overdue fine indication means and means for energizing said item overdue fine indication means from said item status signal.

5. A data processing system as recited in claim 4 further comprising means for calculating overdue fines from data stored in said directly access item status storage locations whereby said energized overdue fine indication means indicates the amount of overdue fines.

6. A data processing system as recited in claim 2 further comprising:

means for directly accessing an additional item status storage location in said data storage means, said additional item status storage location having an address directly determined by said item identifying data signals from said reading means, and means for generating an additional item status signal responsive to data in said additional directly access item status storage location.

7. A data processing system as recited in claim 4 further comprising:

overdue fine indication means, means for energizing said overdue fine indication means from said item status signal, item reserve indication means, and means for energizing said item reserve indication means from said additional item status signal.

8. A data processing system as recited in claim 1 further comprising user delinquent indication means and means for energizing said user delinquent indication means from said user status signal.

9. A data processing system as recited in claim 1 further comprising confirmed indication means and means for energizing said confirmed indication means from said user status signal.

10. A data processing system as recited in claim 1 whrein each item label means is affixed to said item and not removable therefrom.

11. A data processing system as recited in claim 1 wherein said circulation station comprises item damage signal generating means for generating item damage signals, and said system further comprises:

means for retrieving from said directly accessed circulation status location the user identifying data signals corresponding to said item identifying data signals, means for directly accessing a user memory storage location having an address directly determined by said retrieved user identifying data signals, and means for storing in said user memory storage locations item damage data signals in response to said generated item damage signal.

* * * * *